(12) United States Patent
Kosugi

(10) Patent No.: US 11,784,716 B2
(45) Date of Patent: Oct. 10, 2023

(54) COMMUNICATION SYSTEM, OPTICAL TRANSCEIVER, CONTROL METHOD BY COMMUNICATION SYSTEM, AND CONTROL METHOD BY OPTICAL TRANSCEIVER

(71) Applicant: SUMITOMO ELECTRIC DEVICE INNOVATIONS, INC., Kanagawa (JP)

(72) Inventor: Yuji Kosugi, Kanagawa (JP)

(73) Assignee: SUMITOMO ELECTRIC DEVICE INNOVATIONS, INC., Kanagawa (JP)

( * ) Notice: Subject to any disclaimer, the term of this patent is extended or adjusted under 35 U.S.C. 154(b) by 0 days.

(21) Appl. No.: 17/807,228

(22) Filed: Jun. 16, 2022

(65) Prior Publication Data

US 2022/0416899 A1 Dec. 29, 2022

(30) Foreign Application Priority Data

Jun. 24, 2021 (JP) ................................ 2021-104741

(51) Int. Cl.
*H04B 10/079* (2013.01)
*H04B 10/40* (2013.01)
*H04B 10/293* (2013.01)
*H04B 10/2513* (2013.01)

(52) U.S. Cl.
CPC ....... *H04B 10/40* (2013.01); *H04B 10/07953* (2013.01); *H04B 10/25137* (2013.01); *H04B 10/293* (2013.01)

(58) Field of Classification Search
None
See application file for complete search history.

(56) References Cited

U.S. PATENT DOCUMENTS

| | | | | |
|---|---|---|---|---|
| 9,184,841 | B2 * | 11/2015 | Robinson | H04B 10/541 |
| 9,454,059 | B1 * | 9/2016 | Nagarajan | G02F 1/2257 |
| 10,333,622 | B2 * | 6/2019 | Bhoja | H04B 10/2575 |
| 10,333,627 | B2 * | 6/2019 | Rope | H04L 27/18 |
| 10,720,995 | B1 * | 7/2020 | Mazzini | H04L 25/4917 |
| 10,727,950 | B2 * | 7/2020 | Teranishi | H04B 10/505 |
| 10,903,908 | B2 * | 1/2021 | Sano | H04B 10/541 |
| 11,070,288 | B1 * | 7/2021 | Guzzon | H04B 10/40 |
| 11,101,890 | B2 * | 8/2021 | Mazzini | H04B 10/2507 |
| 11,201,768 | B1 * | 12/2021 | Lee | H04L 7/0334 |

(Continued)

FOREIGN PATENT DOCUMENTS

| | | |
|---|---|---|
| JP | 2008-113386 | 5/2008 |
| JP | 2017-216681 | 12/2017 |

*Primary Examiner* — Jai M Lee
(74) *Attorney, Agent, or Firm* — IPUSA, PLLC

(57) ABSTRACT

A first optical transceiver includes a transmission signal processor that generates a multi-valued pulse amplitude modulation signal including a fixed bit pattern. The first optical transceiver includes an optical transmitter that transmits the multi-valued pulse amplitude modulation signal as an optical transmission signal. The first optical transceiver includes an optical receiver that receives an optical adjustment signal from a second optical transceiver to reproduce an adjustment signal from the optical adjustment signal. The first optical transceiver includes a first controller that controls the transmission signal processor based on a bit error rate included in the optical adjustment signal to adjust light power at each level of the optical transmission signal.

4 Claims, 12 Drawing Sheets

(56) References Cited

U.S. PATENT DOCUMENTS

| | | | |
|---|---|---|---|
| 11,239,912 B2* | 2/2022 | Rope | H04B 10/07953 |
| 11,296,794 B2* | 4/2022 | Hashemi Talkhooncheh | G02F 1/225 |
| 11,546,055 B2* | 1/2023 | Guzzon | H04B 10/0775 |
| 11,581,856 B2* | 2/2023 | Hu | H03F 3/45085 |
| 11,616,578 B2* | 3/2023 | Draper | H04B 10/0795 398/189 |
| 2017/0054533 A1* | 2/2017 | Sonkin | H04B 10/504 |
| 2022/0303018 A1* | 9/2022 | Ishikawa | H04B 10/541 |
| 2022/0329404 A1* | 10/2022 | Misischi | H04L 25/4917 |
| 2023/0034936 A1* | 2/2023 | Tsai | H04B 10/2513 |

\* cited by examiner

COMMUNICATION SYSTEM, OPTICAL TRANSCEIVER, CONTROL METHOD BY COMMUNICATION SYSTEM, AND CONTROL METHOD BY OPTICAL TRANSCEIVER

CROSS-REFERENCE TO RELATED APPLICATION

This application claims priority under 35 U.S.C. § 119 to Japanese Patent Application No. 2021-104741, filed Jun. 24, 2021, the contents of which are incorporated herein by reference in their entirety.

BACKGROUND

1. Field of the Invention

The present disclosure relates to a communication system, an optical transceiver, a control method by the communication system, and a control method by the optical transceiver.

2. Description of the Related Art

In an optical transmission system in which multi-valued optical signals are transmitted and received, an approach to detect an extinction ratio, which is a ratio between a minimum level and a maximum level of optical power, through an optical receiver and to feed a detection result back into an optical transmitter is known in order to adjust the optical power (see, for example, Patent Document 1).

In an optical transmitter that transmits multi-valued optical signals, an approach to set an amplitude at each level of an input electrical signal to a laser element, based on the relationship between the input electrical signal and luminescence intensity obtained for the laser element, is known in order for a difference in luminescence intensity between levels of an optical signal to correspond to a predetermined ratio (see, for example, Patent Document 2).

RELATED-ART DOCUMENTS

Patent Document

[Patent Document 1] Japanese Unexamined Patent Application Publication No. 2008-113386
[Patent Document 2] Japanese Unexamined Patent Application Publication No. 2017-216681

SUMMARY

A communication system in the present disclosure includes a first optical transceiver. The first optical transceiver includes a transmission signal processor configured to generate a multi-valued pulse amplitude modulation signal including a fixed bit pattern. The first optical transceiver includes a first optical transmitter configured to convert the multi-valued pulse amplitude modulation signal into an optical transmission signal to transmit the optical transmission signal. The first transceiver includes a first optical receiver configured to receive an optical adjustment signal that is transmitted from a second optical transceiver to reproduce an adjustment signal from the optical adjustment signal. The first optical transceiver includes a first controller configured to control the transmission signal processor, the first optical transmitter, and the first optical receiver. The communication system includes the second optical transceiver configured to communicate with the first optical transceiver. The second optical transceiver includes a second optical receiver configured to receive the optical transmission signal to convert the received optical transmission signal into a received signal. The second optical transceiver includes a received-signal processor configured to measure a bit error rate of the received signal, based on the fixed bit pattern. The second optical transceiver includes a second optical transmitter configured to convert the adjustment signal that includes measurement information indicating the bit error rate, into the optical adjustment signal to transmit the optical adjustment signal. The second optical transceiver includes a second controller configured to control the second optical receiver, the received-signal processor, and the second optical transmitter. The first controller is configured to extract the measurement information indicating the bit error rate, from the reproduced adjustment signal. The first controller is configured to control the transmission-signal processor based on the extracted measurement information indicating the bit error rate, to adjust light power at each level of the optical transmission signal.

DESCRIPTION OF EMBODIMENTS

Embodiments of the Present Disclosure

Figure 1:
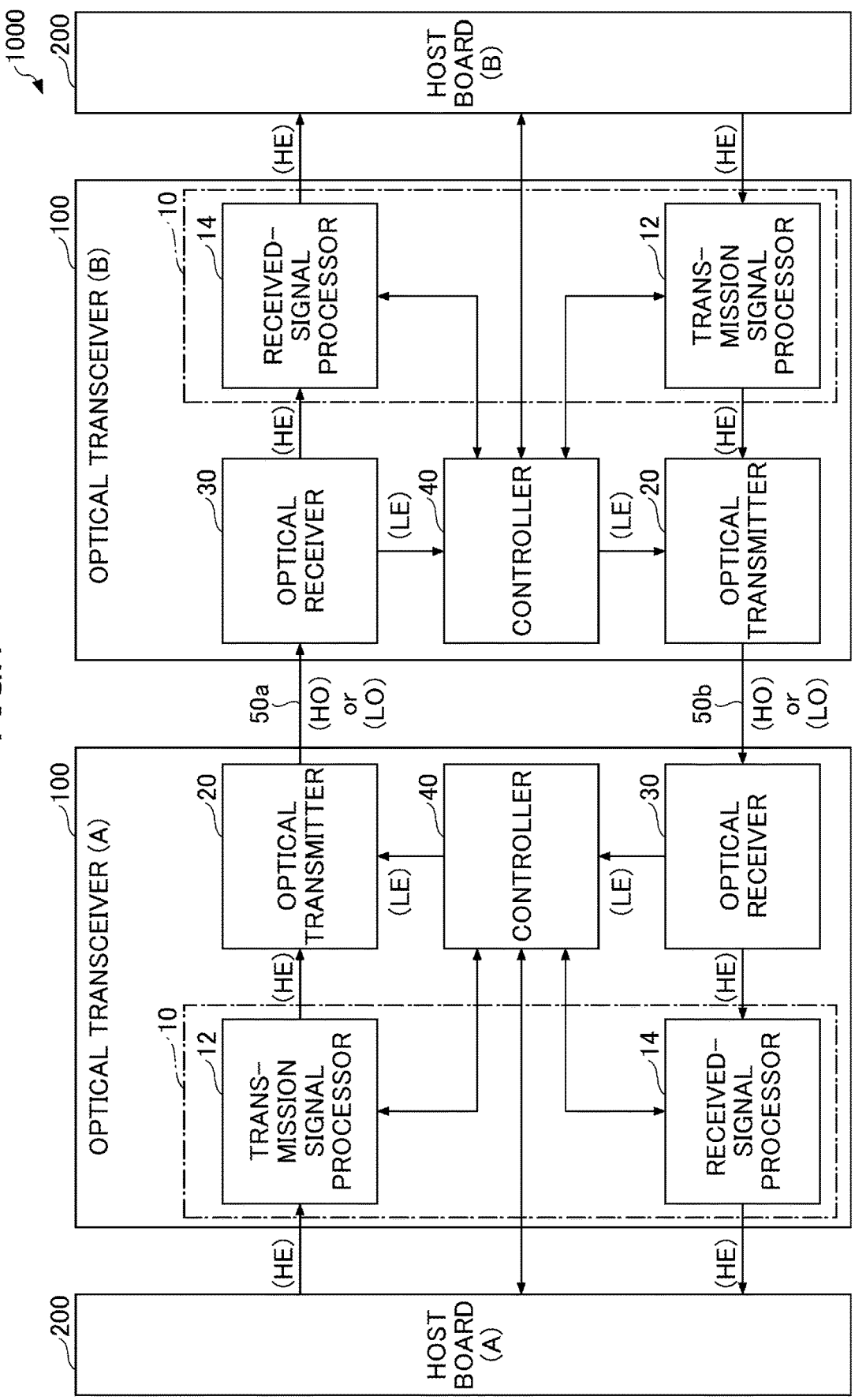
FIG. 1 is a block diagram illustrating an example of a communication system including optical transceivers according to a first embodiment.

Embodiments of the present disclosure will be first described by listing as follows.
[1] A communication system in the present disclosure includes a first optical transceiver. The first optical transceiver includes a transmission signal processor configured to generate a multi-valued pulse amplitude modulation signal including a fixed bit pattern. The first optical transceiver includes a first optical transmitter configured to convert the multi-valued pulse amplitude modulation signal into an optical transmission signal to transmit the optical transmission signal. The first transceiver includes a first optical receiver configured to receive an optical adjustment signal that is transmitted from a second optical transceiver to reproduce an adjustment signal from the optical adjustment signal. The first optical transceiver includes a first controller configured to control the transmission signal processor, the first optical transmitter, and the first optical receiver. The communication system includes the second optical transceiver configured to communicate with the first optical transceiver. The second optical transceiver includes a second optical receiver configured to receive the optical transmission signal to convert the received optical transmission signal into a received signal. The second optical transceiver includes a received-signal processor configured to measure a bit error rate of the received signal, based on the fixed bit pattern. The second optical transceiver includes a second optical transmitter configured to convert the adjustment signal that includes measurement information indicating the bit error rate, into the optical adjustment signal to transmit the optical adjustment signal. The second optical transceiver includes a second controller configured to control the second optical receiver, the received-signal processor, and the second optical transmitter. The first controller is configured to extract the measurement information indicating the bit error rate, from the reproduced adjustment signal. The first controller is configured to control the transmission-signal processor based on the extracted measurement information indicating the bit error rate, to adjust light power at each level of the optical transmission signal.

In such a communication system, when a communication error occurs between optical transceivers, a bit error rate obtained based on a fixed bit pattern is transmitted and received using an optical adjustment signal, and thus optical power at each level of an optical transmission signal is adjusted. With this arrangement, an operating state can automatically return from a communication error state.

[2] In one aspect of the present disclosure, an optical transceiver for communicating with a second optical transceiver via an optical fiber includes an optical receiver configured to receive, from the second optical transceiver, (i) a first optical transmission signal and (ii) a first optical adjustment signal that includes measurement information indicating a bit error rate that is measured by the second optical transceiver. The optical receiver is configured to convert the received first optical transmission signal into a first received signal. The optical receiver is configured to reproduce a first adjustment signal from the received first optical adjustment signal. The optical transceiver includes a received-signal processor configured to measure a bit error rate of the first received signal, based on a fixed bit pattern. The optical transceiver includes a transmission signal processor configured to generate a multi-valued pulse amplitude modulation signal including the fixed bit pattern. The optical transceiver includes an optical transmitter configured to convert the multi-valued pulse amplitude modulation signal into a second optical transmission signal. The optical transmitter is configured to transmit the second optical transmission signal to the second optical transceiver. The optical transmitter is configured to convert, into a second optical adjustment signal, a second adjustment signal that includes measurement information indicating the bit error rate that is measured by the received-signal processor. The optical transmitter is configured to transmit the second optical adjustment signal to the second optical transceiver. The optical transceiver includes a controller configured to control the optical receiver, the received-signal processor, the transmission signal processor, and the optical transmitter. The controller is configured to extract, from the first adjustment signal reproduced by the optical receiver, the measurement information indicating the bit error rate that is measured by the second optical transceiver. The controller is configured to control the transmission signal processor based on the extracted measurement information indicating the bit error rate, to adjust light power at each level of the second optical transmission signal.

In such an optical transceiver, when a communication error occurs between optical transceivers, a bit error rate obtained based on a fixed bit pattern is transmitted and received using an optical adjustment signal, and thus optical power at each level of an optical transmission signal is adjusted. With this arrangement, an operating state can automatically return from a communication error state.

[3] In one aspect of the present disclosure, a control method by a communication system, including a first optical transceiver and a second optical transceiver that communicates with the first optical transceiver, includes generating, by the first optical transceiver, a multi-valued pulse amplitude modulation signal including a fixed bit pattern. The control method includes converting, by the first optical transceiver, the multi-valued pulse amplitude modulation signal into an optical transmission signal to transmit the optical transmission signal. The control method includes receiving, by the first optical transceiver, an optical adjustment signal that is transmitted from the second optical transceiver to reproduce an adjustment signal from the optical adjustment signal. The control method includes receiving, by the second transceiver, the optical transmission signal to convert the received optical transmission signal into a received signal. The control method includes measuring, by the second transceiver, a bit error rate of the received signal, based on the fixed bit pattern. The control method includes converting, by the second transceiver, the adjustment signal that includes measurement information indicating the bit error rate, into the optical adjustment signal to transmit the optical adjustment signal. The control method includes extracting, by the first transceiver, the measurement information indicating the bit error rate, from the reproduced adjustment signal. The control method includes adjusting, by the first transceiver, optical power at each level of the optical transmission signal to be transmitted to the second optical transceiver, based on the extracted measurement information indicating the bit error rate.

In such a control method by the communication system, when a communication error occurs between optical transceivers, a bit error rate obtained based on a fixed bit pattern is transmitted and received using an optical adjustment signal, and thus optical power at each level of an optical transmission signal is adjusted. By this method, an operating state can automatically return from a communication error state.

[4] In one aspect of the present disclosure, a control method by an optical transceiver that communicates with a second optical transceiver includes receiving (i) a first optical transmission signal and (ii) a first optical adjustment signal that includes measurement information indicating a bit error rate that is measured by the second optical transceiver. The control method includes converting the received first optical transmission signal into a first received signal. The control method includes reproducing a first adjustment signal from the received first optical adjustment signal. The control method includes measuring a bit error rate of the first received signal, based on a fixed bit pattern. The control method includes generating a multi-valued pulse amplitude modulation signal including the fixed bit pattern. The control method includes converting the multi-valued pulse amplitude modulation signal into a second optical transmission signal. The control method includes transmitting the second optical transmission signal to the second optical transceiver. The control method includes converting, into a second optical adjustment signal, a second optical adjustment signal that includes measurement information indicating a measured bit error rate. The control method includes extracting the measurement information indicating the bit error rate measured by the second optical transceiver, from the reproduced first optical adjustment signal. The control method includes adjusting optical power at each level of the second optical transmission signal, based on the extracted measurement information indicating the bit error rate.

In such a control method by the optical transceiver, when a communication error occurs between optical transceivers, a bit error rate obtained based on a fixed bit pattern is transmitted and received using an optical adjustment signal, and thus optical power at each level of an optical transmission signal is adjusted. By this method, an operating state can automatically return from a communication error state.

Details of Embodiments of the Present Disclosure

Specific examples of a communication system including optical transceivers in the present disclosure will be described below with reference to the drawings. The present disclosure is not limited to examples below. In the following description, the same components or corresponding components are denoted by the same numerals, and accordingly, the description thereof may be omitted. A single arrow may indicate one or more signal lines.

First Embodiment

[Configuration of Communication System]

FIG. 1 is a block diagram illustrating an example of a communication system including optical transceivers according to a first embodiment. A communication system 1000 illustrated in FIG. 1 includes two optical transceivers 100 that transmit and receive optical signals via two optical fibers 50a and 50b. The communication system 1000 also includes host boards 200 that are coupled to the optical transceivers 100, respectively. For example, optical signals are transmitted from one optical transceiver, among the two optical transceivers, to the other optical transceiver via the optical fiber 50a, and optical signals are transmitted from the other optical transceiver to the one optical transceiver via the optical fiber 50b.

In FIG. 1, HE indicates a flow of a transmitted high-speed electrical signal, and LE indicates a flow of a transmitted low-speed electrical signal. For example, a bit rate (transmission rate) of the high-speed electrical signal is greater than a bit rate of the low-speed electrical signal. HO indicates a flow of a transmitted high-speed optical signal, and LO indicates a flow of a transmitted low-speed optical signal.

For example, a bit rate of the high-speed optical signal is greater than a bit rate of the low-speed optical signal. The bit rate of the high-speed optical signal is, for example, 50 Gbit/s or more per channel that corresponds to an optical signal (single optical signal) having a single wavelength. The high-speed optical signal or low-speed optical signal is transmitted via each of the optical fibers 50a and 50b, based on operating states of the optical transceivers 100. For example, in a state in which a communication error does not occur, the high-speed optical signal is transmitted to a given optical transceiver.

Although not particularly limited, the bit rate of the low-speed electrical signal is one-thousandth or less the bit rate of the high-speed electrical signal. The bit rate of the low-speed optical signal is one-thousandth or less the bit rate of the high-speed optical signal. For example, the bit rate of the high-speed electrical signal is 50 Gbit/s or more. Operating states of the optical transceivers 100 will be described with reference to FIGS. 2 to 9.

In the following, one of the two optical transceivers 100 is also referred to as an optical transceiver A, and the other optical transceiver is also referred to as an optical transceiver B. The host board 200 coupled to the optical transceiver A is also referred to as a host board A, and the host board 200 coupled to the optical transceiver B is also referred to as a host board B. For example, the optical transceivers A and B have the same circuit configuration. When the optical transceiver A has performance and functions that are similar to performance and functions of the optical transceiver B, the optical transceivers A and B may have different circuit configurations.

Each optical transceiver 100 is coupled to a communication device such as a corresponding host board 200 that transmits and receives an electrical signal. The optical transceiver 100 is, for example, a pluggable optical transceiver and has an outer shape that can be inserted in a cage (not illustrated) mounted on a corresponding host board 200. The optical transceiver 100 has a function of converting the high-speed electrical signal, which is received from a corresponding host board, into the high-speed optical signal and of outputting the high-speed optical signal to the optical fiber 50a (or 50b) via an optical connector (not illustrated), for example. The output high-speed optical signal is transmitted to the other optical transceiver 100 via the optical fiber 50a (or 50b).

The optical transceiver 100 also has a function of (i) converting the high-speed optical signal, which is received from the optical fiber 50b (or 50a) via an optical connector (not illustrated), into the high-speed electrical signal and (ii) transmitting the electrical signal to a corresponding host board 200. The optical fiber 50a (or 50b) may not be necessarily a single cable. Although not illustrated, in the communication system 1000, (i) a device such as an optical amplifier or an optical switch, (ii) a wavelength division multiplexing filter, or the like may be included in a middle portion of each of the two optical fibers 50a and 50b.

Each optical transceiver 100 includes a transmission signal processor 12, a received-signal processor 14, an optical transmitter 20, an optical receiver 30, and a controller 40. For example, the transmission signal processor 12 and the received-signal processor 14 are included in a semiconductor integrated circuit device 10, such as a digital signal processor (DSP) or an application specific integrated circuit (ASIC). For example, the controller 40 is included in a central processing unit (CPU) as one chip. In this case, the function of the controller 40 may be implemented by a control program that the CPU executes.

The transmission signal processor 12 converts a digital high-speed electrical signal, which is received from a given host board 200, into a high-speed electrical signal by, for example, pulse amplitude modulation (PAM). A 4-level pulse amplitude modulation (PAM4) signal having four amplitude levels is an example of a multi-valued pulse amplitude modulation signal. The PAM4 signal is, for example, a signal of which a voltage level indicates one among four levels, i.e., from level 0 to level 3. A voltage magnitude at level n (n is an integer selected from 1 to 3) is greater than a voltage magnitude at level n−1.

The transmission signal processor 12 further encodes encoded data, which is received from the host board 200 through the high-speed electrical signal, by a technique such as KP4-forward error correction (FEC). The transmission signal processor 12 outputs a generated high-speed electrical signal to the optical transmitter 20. Instead of using the transmission signal processor 12, the host board 200 may encode the high-speed electrical signal.

The optical transmitter 20 includes, for example, a laser diode driver and a laser diode. The optical transmitter 20 converts, into an optical signal, (i) the high-speed electrical signal HE received from the transmission signal processor 12 or (ii) the low-speed electrical signal LE received from the controller 40. The high-speed optical signal HO corresponds to an optical signal converted from the high-speed electrical signal HE. The low-speed optical signal LO corresponds to an optical signal converted from the low-speed electrical signal LE. The optical transmitter 20 converts only one signal of the high-speed electrical signal HE and the low-speed electrical signal LE, into an optical signal. The controller 40 selects one of the high-speed electrical signal and the low-speed electrical signal, as a target to be converted into a given optical signal.

For example, when the optical transmitter 20 converts the high-speed electrical signal HE into the optical signal, the controller 40 does not transmit the low-speed electrical signal LE to the optical transmitter 20. When the optical transmitter 20 converts the low-speed electrical signal LE into the optical signal, the controller 40 preliminarily instructs the transmission signal processor 12 to stop transmitting the high-speed electrical signal HE, while the transmission signal processor 12 does not transmit the high-speed electrical signal HE to the optical transmitter 20.

The optical transmitter 20 outputs any one of the high-speed optical signal HO and the low-speed optical signal LO, via the optical fiber 50a (or 50b). For example, the high-speed optical signal output from the optical transmitter 20 is a PAM4 signal. The optical transmitter 20 generates multiple optical signals (single optical signals) of different wavelengths to multiplex the optical signals to form one WDM optical signal (wavelength division multiplexed signal), and may output the WDM optical signal via the optical fiber 50a (or 50b). In the following description, a case in which the transmitted optical signal is a single optical signal having a single wavelength will be described.

For example, a modulation rate for the low-speed optical signal LO is 1 MBaud or less and is one-thousandth or less of a modulation rate for the high-speed optical signal HO. For example, the low-speed optical signal is an non-return-to-zero (NRZ) signal. The NRZ signal can be generated by amplitude modulation that is performed using binary values. In the following, the high-speed optical signal HO obtained by the PAM is also referred to as a high-speed PAM optical signal, and the low-speed optical signal LO used in the NRZ is also referred to as a low-speed NRZ optical signal. For example, a modulation rate for the high-speed optical signal HO is 25 GBaud or more. The high-speed optical signal HO, which includes information transmitted through the high-speed electrical signal HE, is an example of an optical transmission signal. The low-speed optical signal LO is an example of an optical adjustment signal.

When the low-speed electrical signal LE is converted into the low-speed optical signal LO, converting of the signal is performed by varying a bias current to be supplied to a laser diode in accordance with a voltage as the low-speed electrical signal LE. For example, when the bias current is adjusted to have a magnitude that is less than or equal to a current threshold for the laser diode, the low-speed optical signal LO becomes in a state of "0", indicating that optical power is relatively small, and when the bias current is adjusted to have a magnitude that is greater than the current threshold, the low-speed optical signal LO becomes in a state of "1", indicating that optical power is relatively great. With this arrangement, by varying the bias current to be in any one of two states, amplitude modulation is performed using binary values and thus the low-speed optical signal LO can be generated. The optical transmitters 20 are examples of a first optical transmitter and a second optical transmitter.

For example, the optical receiver 30 includes a photoelectric conversion element such as a photodiode, and includes an amplifier such as a transimpedance amplifier. The optical receiver 30 receives the high-speed optical signal HO or the low-speed optical signal LO via the optical fiber 50a (or 50b), and converts the received high-speed optical signal HO or low-speed optical signal LO into a current signal (photocurrent). For example, the high-speed optical signal received by the optical receiver 30 is a PAM4 signal.

The optical receiver 30 separates one WDM optical signal (wavelength division multiplexed signal), which is received via the optical fiber 50a (or 50b), into a plurality of optical signals (single optical signals) having different wavelengths, and may convert each of the plurality of single optical signals into a current signal, by using a photoelectric conversion element. In the following description, a case where a received optical signal is a single optical signal having a single wavelength is described.

The optical receiver 30 amplifies a weak current signal obtained through conversion, outputs the high-speed electrical signal HE converted from the high-speed optical signal HO, to the received-signal processor 14, and outputs the low-speed electrical signal LE converted from the low-speed optical signal LO, to the controller 40. For example, the high-speed electrical signal HE is an output of a transimpedance amplifier, and the low-speed electrical signal LE is an output of a current monitor circuit that is comprised of discrete components. The low-speed electrical signal LE may be generated using a function, of monitoring the current, implemented by the transimpedance amplifier. The high-speed electrical signal HE is an example of a received signal. The high-speed electrical signal HE may be a differential signal that consists of a pair of complementary signals.

When the optical receiver 30 receives the low-speed optical signal LO, the controller 40 recognizes a clock of the low-speed electrical signal LE, and then receives the low-speed electrical signal LE. When the optical receiver 30 receives the high-speed optical signal HO, the low-speed electrical signal LE has a fixed value, and thus the controller 40 does not receive the low-speed electrical signal LE. With this arrangement, if the controller 40 does not receive the low-speed electrical signal LE, the controller 40 can determine that the optical receiver 30 receives the high-speed optical signal HO. In contrast, if the controller 40 receives the low-speed electrical signal LE, the controller 40 can determine that the optical receiver 30 receives the low-speed optical signal LO.

The controller 40 extracts information included in the low-speed electrical signal LE, by, for example, converting an analog low-speed electrical signal LE output from the optical receiver 30, into a digital signal. For example, the extracted information is stored as digital data in a memory within the controller 40, or is used in a logic circuit for control. The low-speed electrical signal LE included in the current signal is an example of an adjustment signal. The optical receivers 30 are examples of a first optical receiver and second optical receiver.

A voltage of the analog electrical signal output from the optical receiver 30 varies in accordance with, for example, intensity (optical power) of a received optical signal. The optical receiver 30 may output a digital electrical signal, instead of the analog electrical signal. In this case, the digital electrical signal is, for example, a pulse signal of which the voltage is in any one of fixed levels of 0 and 1.

The received-signal processor 14 converts the analog high-speed electrical signal HE, which is received from the optical receiver 30, into a digital high-speed electrical signal HE. The received-signal processor 14 demodulates the digital high-speed electrical signal HE converted from the analog high-speed electrical signal HE, by performing forward error correction (FEC), and then outputs the demodulated digital high-speed electrical signal HE to a corresponding host board 200 as received data. Also, for example, while error correction of the high-speed electrical signal is performed, when an error occurs during reception of a communication frame, the received-signal processor 14 determines that frame loss occurs. A case where error occurs during reception of the communication frame means that communication frames cannot be synchronized, for example. When a header of the communication frame cannot be detected, communication frames cannot be synchronized, for example. Also, when the communication frame has a checksum for data that is stored in a payload, error may occur during reception, ever in a case where a data error is detected through the checksum.

The received-signal processor 14 outputs information indicating the presence or absence of occurrence of frame loss, to the controller 40 as information indicating the presence or absence of occurrence of a communication error. Error correction for the high-speed electrical signal HE may be performed by a given host board 200. In this case, information indicating the presence or absence of occurrence of frame loss is transmitted from the host board 200 to the controller 40. Communication between the host board 200 and the controller 40 may be via, for example, a serial communication bus or dedicated signal line.

The controller 40 controls the operation of a given optical transceiver 100 in a high-speed communication mode in which the optical transceivers 100 transmit and receive high-speed optical signals HO in the communication system 1000. When detecting a communication error, between the optical transceivers 100, based on information from the received-signal processor 14 that indicates occurrence of frame loss, the controller 40 changes an operating mode from the high-speed communication mode to an adjustment mode. The controller 40 adjusts a characteristic of the high-speed optical signal HO to be transmitted from the given optical transceiver 100, in order to prevent the communication error. Examples of the controller 40 that operates in each of the high-speed communication mode and the adjustment mode will be illustrated in FIGS. 2 to 9.

[Sequence of Operation of Optical Transceivers A and B]

Figure 2:
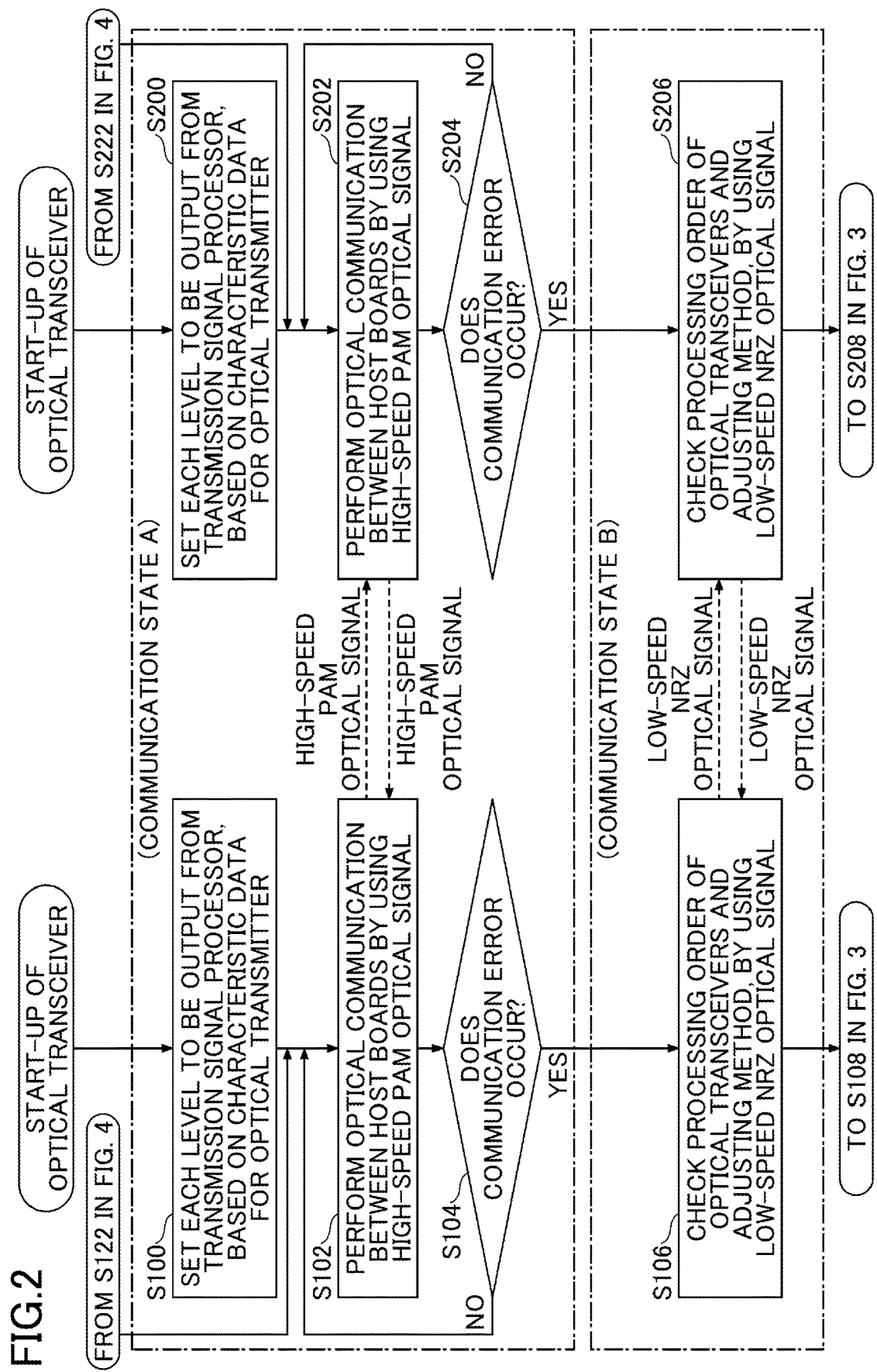
FIG. 2 is an operational flow diagram illustrating an example of the optical transceivers that communicate with each other in the communication system illustrated in FIG. 1.
Figure 3:
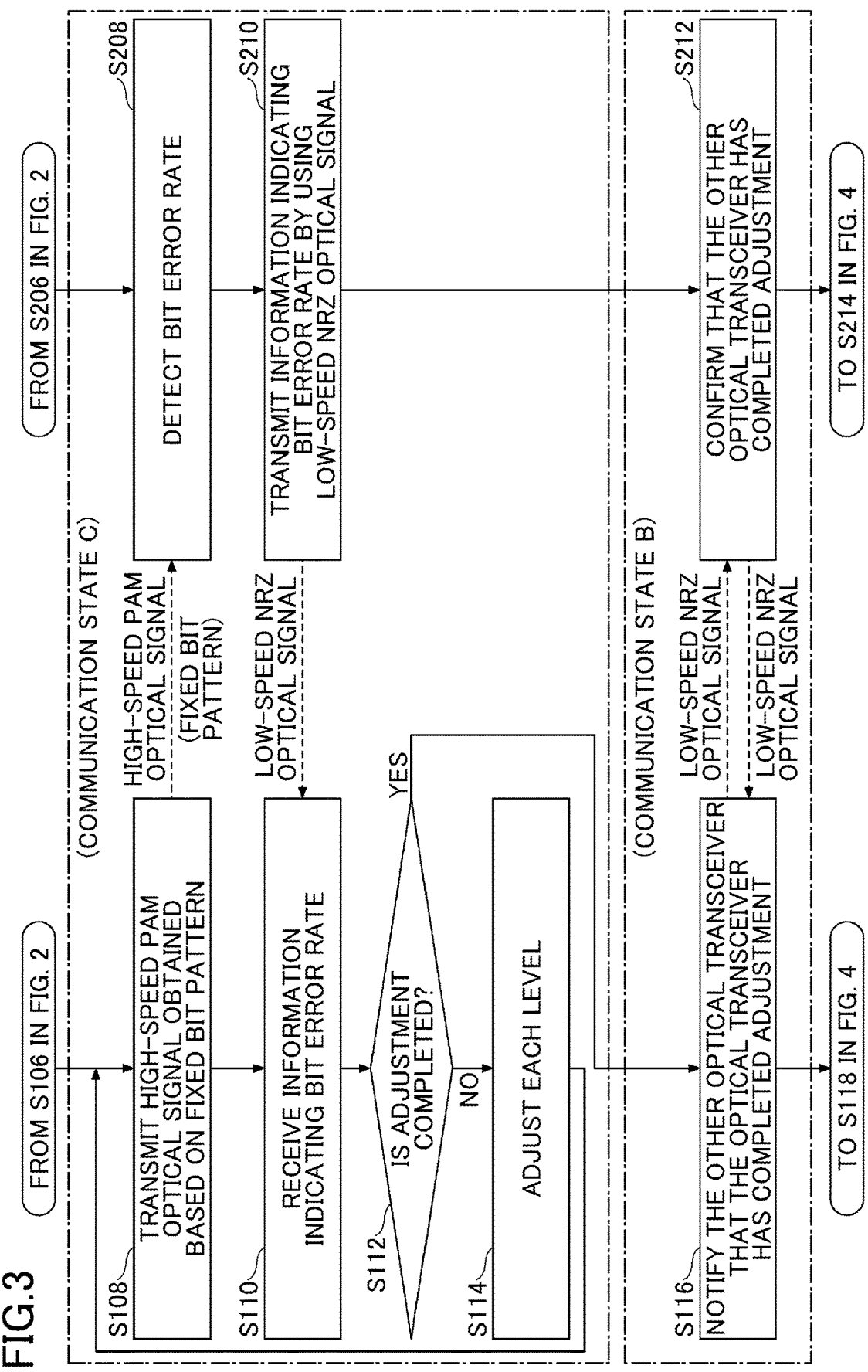
FIG. 3 is a flow diagram illustrating a continuation of the operation of FIG. 2.
Figure 4:
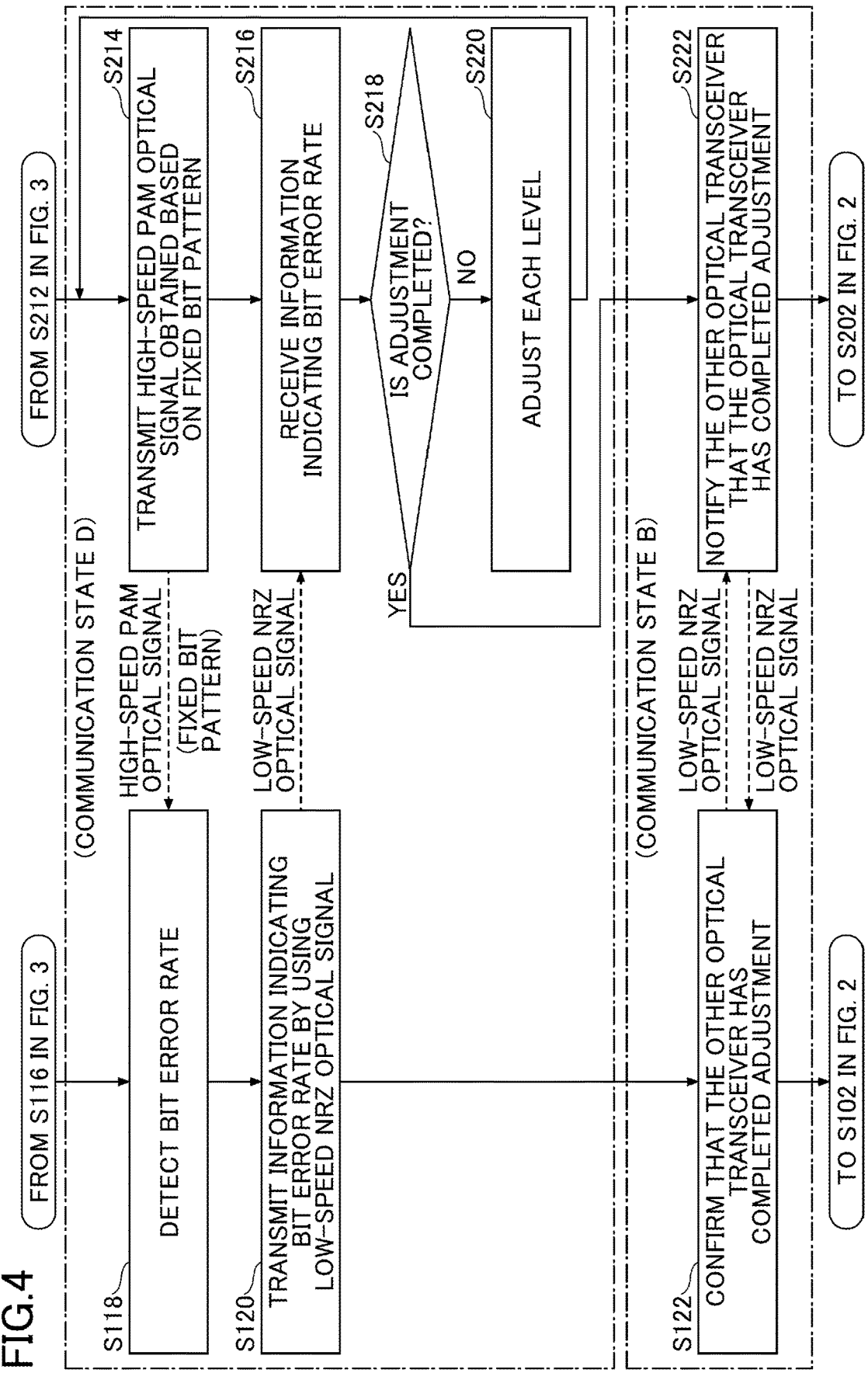
FIG. 4 is a flow diagram illustrating a continuation of the operation of FIG. 3.

FIGS. 2 to 4 are operational flow diagrams illustrating an example of the optical transceivers 100 that communicate with each other in the communication system 1000 illustrated in FIG. 1. FIGS. 2 to 4 illustrate an example of a control method by the communication system 1000 and an example of a control method by the optical transceivers 100. In each of FIGS. 2 to 4, for example, a left-hand flow is illustrated for the operation of the optical transceiver A, and a right-hand flow is illustrated for the operation of the optical transceiver B. For example, each of the optical transceiver A and B may operate when a corresponding controller 40 executes a control program. Each controller 40 is, for example, a microcontroller, and the control program is, for example, firmware that is stored in a memory of the microcontroller. The controller 40 may include a plurality of microcontrollers, a plurality of logic ICs, and the like.

When each of the optical transceivers A and B starts up, it transitions into a communication state A. For example, the optical transceiver A is a pluggable optical transceiver. In this case, when the optical transceiver A is inserted into a cage mounted on the host board A, the optical transceiver A starts up with being powered by the host board A. As in the optical transceiver A, the optical transceiver B is, for example, a pluggable optical transceiver. In this case, when the optical transceiver B is inserted into a cage mounted on the host board B, the optical transceiver B starts up with being powered by the host board B.

When each of the optical transceivers A and B starts up, for example, the controller 40 executes a predetermined program to perform initial setup and the like. Thus, the optical transmitter 20, the optical receiver 30, the transmission signal processor 12, and the received-signal processor 14 are each maintained in a state in which a given operation can be performed. When each of the optical transceivers A and B becomes in a state that can transmit and receive high-speed optical signals HO, a corresponding controller 40 becomes in a state that can communicate with a given host board among the host boards A and B.

The communication state A is a state in which after startup of the optical transceivers A and B, communication between the optical transceivers A and B is performed using high-speed PAM optical signals. In the communication state A, in each of steps S100 and S200, a given transceiver among the optical transceivers A and B sets each level of a given PAM4 signal that is output by the transmission signal processors 12, based on characteristic data for a corresponding optical transmitter 20. Amplitude levels are respectively set based on amplitude information, indicating amplitudes, that is output from the controller 40 to the transmission signal processor 12. The communication between the controller 40 and the transmission signal processor 12 is performed through, for example, a serial communication bus. The levels of the PAM4 signal may be set during the above-mentioned initial setup.

After the levels of the PAM4 signal are set, the optical transceivers A and B communicate with each other using the high-speed PAM optical signals in steps S102 and S202. In the communication through the high-speed PAM optical signals, full duplex communication is performed via two optical fibers 50a and 50b. The control for transmission and reception of the high-speed PAM optical signals in step S102 and step S202 is performed repeatedly for a time period during which a communication error does not occur. Regardless of the communication error, for example, when the host board A sends, to the optical transceiver A, an instruction to stop the communication performed through the high-speed PAM optical signals, transmitting and receiving of the high-speed PAM optical signals may be interrupted. Likewise, when the host board B sends, to the optical transceiver B, an instruction to stop the communication performed through the high-speed PAM optical signals, transmitting and receiving of the high-speed PAM optical signals may be interrupted.

In step S104 and S204, if any one of the optical transceivers A and B detects occurrence of a communication error, the process proceeds to a corresponding step among step S106 and S206. For example, occurrence of communication errors in the PAM4 signal can be detected by error correction, e.g., KP4-FEC. For example, the controller 40 detects the communication error, in response to receiving information that indicates occurrence of frame loss and is from the received-signal processor 14.

For example, the optical transceiver B that has detected the communication error changes an operating mode from the communication state A (high-speed communication mode) to the communication state B. The communication state B is included in the adjustment mode in which levels of the PAM4 signal are adjusted. The transmission signal processor 12 of the optical transceiver B stops transmitting the high-speed electrical signal HE, based on an instruction from the controller 40. Then, in the optical transceiver B, the optical transmitter 20 modulates a laser current of the optical transmitter 20 at low speed, through the low-speed electrical signal LE from the controller 40, and then transmits the low-speed NRZ signal to the optical transceiver A. With this arrangement, the optical transmitter 20 notifies the optical transceiver A of the occurrence of the communication error.

In the optical transceiver A, the controller 40 monitors the low-speed electrical signal LE from the optical receiver 30 to thereby detect occurrence of a communication error in the optical transceiver B. For example, when the optical transceiver B transmits particular binary data indicating the communication error, by using the low-speed NRZ optical signal, the optical transceiver A detects that the particular binary data is included in the received low-speed NRZ optical signal, and thus detects the occurrence of the communication error. That is, the optical transceiver A recognizes that it is necessary to adjust each level of the PAM4 signal that is generated by the transmission signal processor 12, and then the operating mode of the optical transceiver A transitions from the communication state A into the communication state B.

In order to completely change from the communication state A to the communication state B, for example, the optical transceiver A (or B) that first has detected a communication error transmits the low-speed NRZ optical signal, and subsequently, the optical transceiver B (or A) that has received the low-speed NRZ optical signal detects information, indicating the occurrence of the communication error, that is included in the low-speed NRZ optical signal, and then transmits a low-speed NRZ optical signal.

The communication state B is a state in which a measurement condition or the like used to adjust each level of the PAM4 signal is determined through the optical transceivers A and B. In the communication state B, the optical transceivers A and B transmit and receive low-speed NRZ optical signals between each other. A modulation rate for the low-speed NRZ signal is sufficiently less than that for the high-speed PAM optical signal. In this case, a bit error obtained using the high-speed PAM optical signal is sufficiently relatively reduced even when the communication error occurs, and communication between the optical transceivers A and B can be reliable performed.

For example, a modulation rate for the low-speed NRZ signal is set to be one-thousandth or less a modulation rate for the high-speed PAM optical signal. When an amplitude (difference between level 1 and level 0) of the low-speed NRZ signal is the same as that (difference between level 3 and level 0) of the high-speed PAM optical signal, the size of an eye opening of the low-speed NRZ signal is about three times the size of each eye opening of the high-speed PAM optical signal. By increasing the size of the eye opening, an error rate is greatly reduced. With this arrangement, the optical transceivers A and B transition to the communication state B, so as to mutually exchange information indicating at least one of (i) a status of occurrence of a communication error and (ii) an adjustment method of each level of the PAM4 signal.

When the host board A does not wish to transition from the communication state A of the optical transceiver A to the communication state B, the host board A notifies the optical transceiver A that transition of the optical transceiver A into the communication state B is prohibited, at a timing at which the optical transceiver A is started. In this case, even when receiving the low-speed NRZ optical signal indicating occurrence of a communication error, the optical transceiver A remains in the communication state A. For example, when the optical transceiver B does not detect a low-speed NRZ optical signal for a predetermined time period after transmission of the low-speed NRZ optical signal, the optical transceive0072 B confirms that the optical transceiver A does not adjust the amplitude of the PAM4 signal.

Likewise, when the host board B does not wish to transition from the communication state A of the optical transceiver B to the communication state B, the host board B notifies the optical transceiver B that transition of the optical transceiver B into the communication state B is prohibited, at a timing at which the optical transceiver B is started. In this case, even when receiving the low-speed NRZ optical signal indicating occurrence of a communication error, the optical transceiver B remains in the communication state A. For example, when the optical transceiver A does not detect a low-speed NRZ optical signal for a predetermined time period after transmission of the low-speed NRZ optical signal, the optical transceiver A confirms that the optical transceiver B does not adjust the amplitude of the PAM4 signal.

In steps S106 and S206, the optical transceivers A and B communicate with each other by using the low-speed NRZ optical signals. In this case, the laser current of each optical transmitter 20 is modulated at low speed, under the control of a corresponding controller 40. In the communication through the low-speed NRZ optical signal, full duplex communication is enabled using two optical fibers 50a and 50b. Each of the optical transceivers A and B determines an order in which levels of the PAM4 signal are adjusted.

For example, an adjusting order of the levels may be determined based on magnitudes of values indicated by pieces of identifier information, such as serial numbers (manufacturing numbers), for the optical transceivers A and B. For example, if a serial number for the optical transceiver A is smaller than a serial number for the optical transceiver B, levels of the PAM4 signal used in the optical transceiver A are adjusted prior to levels of the PAM4 signal used in the optical transceiver B.

In the adjustment mode, before the adjusting of the levels of the PAM4 signal, each of the optical transceivers A and B checks the following: (i) a pattern type, such as pseudo-random binary sequence quaternary (PRBSQ) or short stress pattern random quaternary (SSPRQ), that is used to measure a bit error rate (BER) and (ii) information on a measurement time period and the like for the BER. For example, PRBS15Q may be used as a pattern, and 5 seconds may be set as a measurement time period for the BER. A bit string having a specific pattern may be used instead of pseudo-random number data such as PRBSQ. The PRBSQ pattern is an example of a fixed bit pattern.

Information used in the adjustment mode is stored in a memory of each controller 40, for example. When a specification of the fixed bit pattern is preset, for example, information about the specification may be stored in the memory of the controller 40 of each of the optical transceivers A and B. In this case, the fixed bit pattern is information known to each of the optical transceivers A and B, and in the communication state B, a process in which the optical transceivers A and B check the specification of the fixed bit pattern can be omitted.

After determining the measurement condition or the like, each of the optical transceivers A and B transitions from the communication state B into a communication state C in FIG. 3. In the communication state C, an adjustment operation in which interoperability with the optical transceiver B is increased is performed by adjusting each level of the PAM4 signal that is generated by the transmission signal processor 12 of the optical transceiver A. In the communication state C, the optical transceiver A transmits the high-speed PAM optical signal and receives the low-speed NRZ optical signal. In contrast, the optical transceiver B receives the high-speed PAM optical signal and transmits the low-speed NRZ optical signal.

When the optical transmitter 20 converts the high-speed PAM4 electrical signal into the high-speed PAM optical signal, a converting characteristic is non-linear, and thus a ratio, for the high-speed PAM optical signal, of the amplitude at level 0 to the amplitude at level 1 is different from a ratio, for the high-speed PAM4 electrical signal, of the amplitude at level 0 to the amplitude at level 1. Likewise, a ratio, for the high-speed PAM optical signal, of the amplitude at level 1 to the amplitude at level 2 is different from a ratio, for the high-speed PAM4 electrical signal, of the amplitude at level 1 to the amplitude at level 2. Also, a ratio, for the high-speed PAM optical signal, of the amplitude at level 2 to the amplitude at level 3 is different from a ratio, for the high-speed PAM4 electrical signal, of the amplitude at level 2 to the amplitude at level 3.

In step S108, the optical transceiver A stops modulating the laser current at low speed, and then transmits the high-speed PAM optical signal including the fixed bit pattern, to the optical transceiver B. At this point, for example, the optical transceiver A sets each level of the high-speed PAM optical signal to an initial value that is determined in step S106 and step S206. The controller 40 of the optical transceiver B detects that the optical transceiver A transitions from the communication state B to the communication state C, based on, for example, a failure to receive the low-speed electrical signal LE. Alternatively, in the communication state B, the optical transceiver A transmits specific binary data indicating that the high-speed PAM optical signal is transmitted in the adjustment mode, by using the low-speed NRZ optical signal, and then the optical transceiver B may transition into the communication state C, by detecting the specific binary data through a received low-speed NRZ optical signal.

When detecting that the optical transceiver A transitions from the communication state B to the communication state C, for example, the optical transceiver B transmits specific binary data indicating the transition into the communication state C, by using the low-speed NRZ optical signal. Then, in step S208, the optical transceiver B detects a bit error rate of the high-speed PAM optical signal, including the fixed bit pattern such as PRBSQ, that is from the optical transceiver A. The controller 40 of the optical transceiver A can detect the specific binary data indicating that the optical transceiver B transitions into the communication state C, based on a received low-speed NRZ optical signal. With this arrangement, the controller 40 of the optical transceiver A confirms that the optical transceiver B transitions from the communication state B into the communication state C.

In the communication state B in FIG. 2, in step S106 and S206, the specification of the fixed bit pattern has been confirmed by the optical transceivers A and B. Therefore, the optical transceiver B can appropriately calculate a bit error rate based on a received fixed bit pattern.

For example, the bit error rate is detected every time the optical transceiver A changes the level of the high-speed PAM optical signal in step S208. Then, in step S210, the optical transceiver B transmits BER information indicating the bit error rate to the optical transceiver A, by using the low-speed NRZ optical signal. The steps S208 and S210 are repeatedly performed at a timing in which the optical transceiver A changes the level of the high-speed PAM optical signal and transmits the high-speed PAM optical signal. When the optical transceiver B fails to receive a high-speed PAM optical signal from the optical transceiver A, the optical transceiver B shifts the operating state from the communication state C to the communication state B.

In step S110, the optical transceiver A receives the BER information included in the low-speed NRZ optical signal, from the optical transceiver B. At this time, the optical transceiver A may continue to transmit the high-speed PAM optical signal in step S108 until the optical transceiver A receives, from the optical transceiver B, the BER information that is included in the low-speed NRZ optical signal. With this arrangement, by changing each level of the high-speed PAM optical signal and then transmitting the high-speed PAM optical signal, the optical transceiver A can reliably receive the BER information. Then, in step S112, the optical transceiver A determines whether the PAM4 signal is completely adjusted.

For example, when a bit error corresponding to the bit error rate indicated by the BER information can be corrected by KP4-FEC or the like, the optical transceiver A determines that the PAM4 signal is completely adjusted. For example, in the KP4-FEC, when there is a statistically random error, in a case where a BER value is $2.4\times10^{-4}$ or less, data obtained before being encoded by KP4-FEC can be corrected such that the BER value is $1\times10^{-12}$ or less. With this arrangement, for example, when the optical transceiver A transmits the data encoded by KP4-FEC, and a value of the BER transmitted from the optical transceiver B is $2.4\times10^{-4}$ or less, the optical transceiver A completes the adjustment for the PAM4 signal.

When the adjustment for the PAM4 signal is completed, the optical transceiver A shifts the operating state from the communication state C to the communication state B. If the adjustment is not completed, the optical transceiver A performs the process in step S114.

In step S114, the optical transceiver A adjusts each level of the PAM4 signal and returns to the process in step S108. The following steps are again repeatedly performed: (i) step S108 in which the optical transceiver A transmits the high-speed PAM optical signal including the fixed bit pattern, to the optical transceiver B, (ii) step S208 in which the optical transceiver B detects the bit error rate, (iii) step S210 in which the optical transceiver B transmits bit error rate information by using the low-speed NRZ optical signal, and (iv) steps S110 and S112 in which the optical transceiver A determines whether each level of the high-speed PAM optical signal is completely adjusted. The adjustment of each level will be described below with reference to FIG. 5.

In the communication state B in FIG. 3, in step S116, the optical transceiver A uses the low-speed NRZ optical signal to thereby notify the optical transceiver B that each level is completely adjusted. The optical transceiver A transitions from the communication state B in FIG. 3 into a communication state D (FIG. 4). In the communication state B in FIG. 3, in step S212, based on receiving of the low-speed NRZ optical signal, the optical transceiver B confirms that the optical transceiver A has completely adjusted each level. Then, the communication state B in FIG. 3 is changed to the communication state D (FIG. 4).

In the communication state D in FIG. 4, an operation to adjust each level of the PAM4 signal that is generated by the transmission signal processor 12 of the optical transceiver B is performed. In the communication state D, a process flow by the optical transceiver A is similar to the process flow by the optical transceiver B in the communication state C as illustrated in FIG. 3, and the process flow by the optical transceiver B is similar to the process flow by the optical transceiver A in the communication state C as illustrated in FIG. 3.

In step S214, the optical transceiver B stops modulating the laser current at low speed, and then transmits the high-speed PAM optical signal including the fixed bit pattern, to the optical transceiver A. At this point, for example, the optical transceiver B sets each level of the high-speed PAM optical signal to an initial value that is determined in step S106 and step S206. The controller 40 of the optical transceiver A detects that the optical transceiver B transitions from the communication state B into the communication state D, based on, for example, a failure to receive the low-speed electrical signal LE. Alternatively, in the communication state B, the optical transceiver B transmits specific binary data indicating that the high-speed PAM optical signal is transmitted in the adjustment mode, by using the low-speed NRZ optical signal, and then the optical transceiver A may transition into the communication state D, by detecting the specific binary data through a received low-speed NRZ optical signal.

In step S118, the optical transceiver A detects a bit error rate of the high-speed PAM optical signal, including the fixed bit pattern such as PRBSQ, that is from the optical transceiver B. The bit error rate is detected every time the optical transceiver B changes a given level of the high-speed PAM optical signal in step S118, for example. Then, in step S120, the optical transceiver A transmits BER information indicating a given bit error rate, to the optical transceiver B, by using the low-speed NRZ optical signal. Steps S118 and S120 are repeatedly performed when the optical transceiver B transmits the high-speed PAM optical signal by changing each level of the high-speed PAM optical signal. Then, when the optical transceiver A fails to receive the high-speed PAM optical signal from the optical transceiver B, the optical transceiver A shifts the operating state from the communication state D into the communication state B.

In step S216, the optical transceiver B receives, from the optical transceiver A, the BER information included in the low-speed NRZ optical signal. At this time, the optical transceiver B may continue to transmit the high-speed PAM optical signal in step S214 until the optical transceiver B receives the BER information from the optical transceiver A that is included in the low-speed NRZ optical signal. With this arrangement, by changing each level of the high-speed PAM optical signal and then transmitting the high-speed PAM optical signal, the optical transceiver B can reliably receive the BER information.

Then, in step S218, if it is determined that the adjustment of each level of the PAM4 signal is completed, the optical transceiver B transitions the operating state from the communication state D to the communication state B. As in step S112, when a value of the BER received from the optical transceiver A is less than or equal to a predetermined value (for example, $2.4 \times 10^{-4}$), it may be determined in step S218 that the adjustment is completed. If the adjustment of each level is not completed, the optical transceiver B performs step S220.

In step S220, the optical transceiver B adjusts each level of the PAM4 signal and returns to the process in step S214. In this case, the following steps are again repeatedly performed: (i) step S214 in which the optical transceiver B transmits the high-speed PAM optical signal including the fixed bit pattern, to the optical transceiver A, (ii) step S118 in which the optical transceiver A detects the bit error rate, (iii) step S120 in which the optical transceiver A transmits bit error rate information by using the low-speed NRZ optical signal, and (iv) steps S216 and S218 in which the optical transceiver B determines whether each level of the high-speed PAM optical signal is completely adjusted. The adjustment of each level will be described below with reference to FIG. 5.

In the communication state B in FIG. 4, in step S222, the optical transceiver B uses the low-speed NRZ optical signal to thereby notify an optical transceiver A that the output amplitude is completely adjusted. Then, the optical transceiver B returns to the process in step S202 in FIG. 2. In step S122 in the communication state B as illustrated in FIG. 4, the optical transceiver A confirms that the optical transceiver B completely adjusts each level, in response to receiving the low-speed NRZ optical signal. Then, the optical transceiver A returns to the process in step S102 illustrated in FIG. 2.

Then, after each of the optical transceivers A and B completely adjusts levels, the optical transceivers A and B again communicate with each other through the high-speed PAM optical signals. As described above, the transition from the communication state A into the communication state C is performed through the communication state B. The transition from the communication state C into the communication state D is performed through the communication state B. The transition from the communication state D into the communication state A is performed through the communication state B.

An order of operations in the communication states C and B illustrated in FIG. 3 and an order of operations in the communication states D and B illustrated in FIG. 4 may be replaced with each other. The order of operations in FIGS. 3 and 4 is determined by the process in step S106 and step S206 in the communication state B illustrated in FIG. 2.

Examples of Waveforms of PAM4 Signal and NRZ Signal

Figure 5:
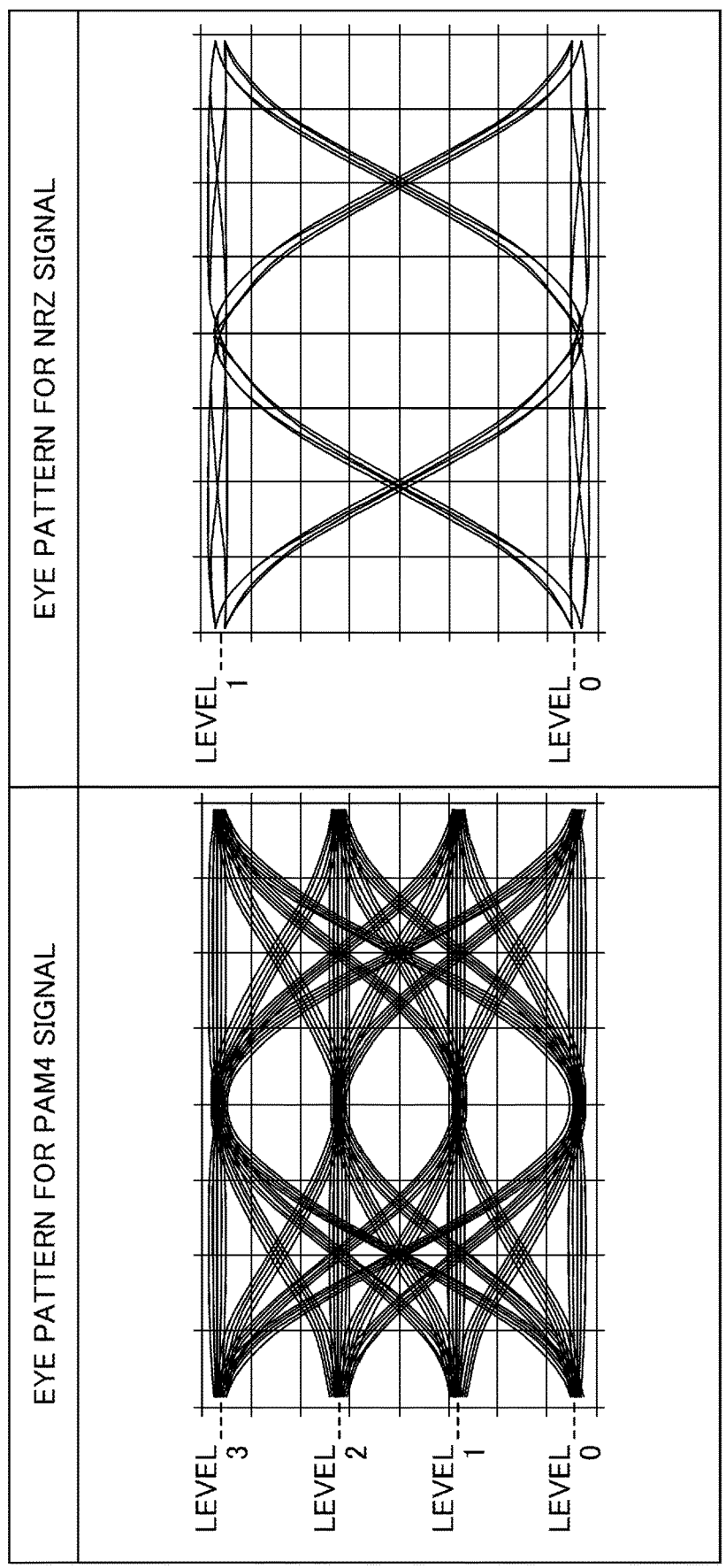
FIG. 5 is a diagram for describing an example of an eye pattern of a PAM4 signal and an eye pattern of an NRZ signal.

FIG. 5 is a diagram for describing an example of eye patterns of the PAM4 signal and an eye pattern of the NRZ signal. The PAM4 signal can have four values obtained in four levels, i.e., level 0 to level 3.

For example, when the high-speed optical signal HO is used, the PAM4 signal can have four values in intensity (optical power). Also, when the high-speed electrical signal HE is used, the PAM4 signal may have, for example, four magnitudes of a voltage. In multi-level modulation, for the high-speed electrical signal HE output from the optical receiver 30, when a noise amount obtained in each level is the same, in a case where a difference in an amplitude between given levels is the same, a bit error rate is minimized.

That is, the bit error rate is minimized when the following condition is satisfied: (i) a voltage difference (amplitude) between level 1 and level 0, (ii) a voltage difference (amplitude) between level 2 and level 1, and (iii) a voltage difference (amplitude) between level 3 and level 2 are the same. Under such a condition, the size of each of eye openings for three eye patterns that are arranged in an amplitude direction at a middle portion of the waveform of the PAM4 signal, as illustrated in FIG. 5, is approximately the same. However, when noise amounts obtained in respective levels are different, in a case where amplitudes obtained at the levels are not the same, a given bit error rate is minimized.

Here, for example, even when amplitudes obtained at respective levels of the high-speed electrical signal HE, which is output from the transmission signal processor 12 of the optical transceiver A, are the same, there are cases where the amplitudes obtained at the levels of the high-speed electrical signal HE, which is received by the received-signal processor 14 of the optical transceiver B, are not the same. Such a condition is referred to as poor linearity in multi-valued modulation, which is caused by at least one of (i) a characteristic of the optical transmitter 20 of the optical transceiver A, (ii) a transmission characteristic of the optical fiber 50a, or (iii) a characteristic of the optical receiver 30 of the optical transceiver B.

For example, when a difference in the amplitude between level 0 to level 3 of the PAM4 signal is the same as a difference in the amplitude between level 0 to level 1 of the NRZ signal, an opening for the PAM4 signal that is obtained with reference to given levels, among level 0 to level 3, is small in comparison to the NRZ signal. Thus, the PAM4 signal has an increased amount of information that can be transmitted, in comparison to the NRZ signal. In contrast, the PAM4 signal is likely to be negatively influenced by linearity provided by the received-signal processor 14, depending on, for example, variations in an optical characteristic or electrical characteristic of the optical receiver 30.

BER that is calculated by the received-signal processor 14, which processes the PAM4 signal, can be improved by adjusting each level of the PAM4 signal through the transmission signal processor 12. Therefore, as described in the communication state C of FIG. 3 and the communication state D of FIG. 4, in the transmission signal processor 12 that generates the PAM4 signal as the high-speed electrical signal HE, each level of the PAM4 signal is adjusted such that the BER obtained on a receiving side is reduced.

For example, in the communication state C of FIG. 3, the controller 40 of the optical transceiver A monitors the BER detected by the optical transceiver B, in a state of fixing levels 0 and 3, while adjusting the amplitude at level 1 such that the BER detected by the optical transceiver B is less than the BER before adjustment. Subsequently, levels 0 and 3 are fixed, and the controller 40 of the optical transceiver A monitors the BER detected by the optical transceiver B, while adjusting an output amplitude of level 2 such that the BER detected by the optical transceiver B is less than before adjustment.

Likewise, in the communication state D of FIG. 4, the controller 40 of the optical transceiver B sequentially adjusts the amplitudes at level 1 and level 2 so as to minimize a given BER detected by the optical transceiver A. The controller 40 of each of the optical transceivers A and B may sequentially adjust both level 1 and level 2 while monitoring a given BER. For example, a true minimum value of the BER may not match both (i) a minimum value determined at level 1 while fixing level 2 and (ii) a minimum value determined at level 2 while fixing level 1. A minimum value of the BER may be determined using, for example, an algorithm or the like of an optimization problem for two parameters.

Operating Example in Each Communication State

Figure 6:
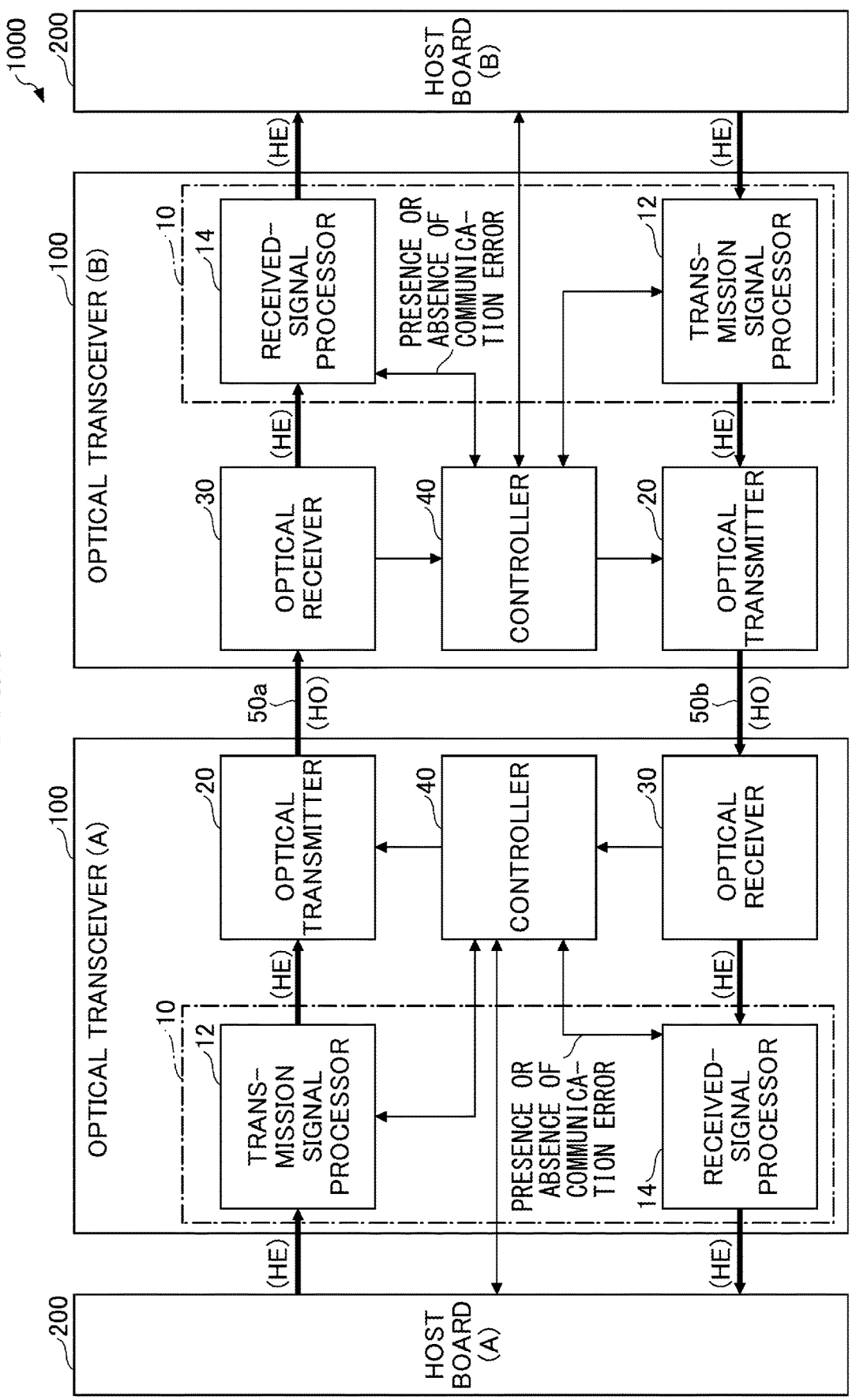
FIG. 6 is a diagram for describing the operation of the communication system including the optical transceivers that transmit and receive high-speed PAM optical signals in a communication state A illustrated in FIG. 2.

FIG. 6 is a diagram for describing the operation of the optical transceivers A and B that transmit and receive high-speed PAM optical signals in the communication system 1000 in the communication state A in FIG. 2. Signal lines expressed by bold arrows indicate paths along which signals are transmitted between the optical transceivers A and B that transmit and receive high-speed PAM signals. Operations of the optical transceivers A and B are the same, and accordingly, the operation of the optical transceiver A will be described below.

The transmission signal processor 12 encodes the high-speed electrical signal that is received from the host board A, and converts the high-speed electrical signal into, for example, a PAM4 signal. The transmission signal processor 12 outputs the PAM4 signal converted from the high-speed electrical signal, to the optical transmitter 20 as a high-speed electrical signal HE. The optical transmitter 20 converts the high-speed electrical signal HE that is received from the transmission signal processor 12, into a high-speed optical signal HO, and outputs the high-speed optical signal HO converted from the high-speed electrical signal, to the optical fiber 50a.

The optical transmitter 20 includes, for example, a laser diode. The optical transmitter 20 varies a drive current (modulated current) of the laser diode in accordance with the high-speed electrical signal HE, and generates the high-speed optical signal HO. The optical transmitter may include, for example, (i) a light source that generates continuous light (CW light) and (ii) an optical modulator coupled to the light source. The optical modulator may be driven in accordance with the high-speed electrical signal HE, in order to generate the high-speed optical signal HO, from the CW light.

The optical receiver 30 receives the high-speed optical signal HO via the optical fiber 50a, converts the received high-speed optical signal HO into a current signal (photocurrent), amplifies the current signal converted from the high-speed optical signal HO, and outputs the current signal to the received-signal processor 14 as an analog high-speed electrical signal HE. The high-speed electrical signal HE output from the optical receiver 30 is, for example, an electrical signal converted from a current signal.

The received-signal processor 14 converts the analog high-speed electrical signal HE that is received from the optical receiver 30, into a digital high-speed electrical signal. The received-signal processor 14 also performs error correction, for example, and then outputs the digital high-speed electrical signal to the host board 200. With this arrangement, information included in the high-speed electrical signal, which is input to the optical transceiver A from the host board A, is reproduced by the optical transceiver B and is transmitted to the host board B. The information transmitted from the host board A to the host board B is a set of binary data. When a logical value of a bit is inverted during transmission, a bit error occurs.

The received-signal processor 14 determines whether frame loss occurs in error correction, and outputs, to the controller 40, information indicating the presence or absence of occurrence of a communication error. Error correction may be performed at the host board 200, and in this case, the information indicating the presence or absence of the occurrence of the frame loss is transmitted from the host board 200 to the controller 40.

When the controller 40 detects the communication error between optical transceivers 100, based on the receiving of the BER information, the communication state A is changed to the communication state B as illustrated in FIG. 2. For example, when frame loss occurs, the controller 40 stores a value indicating that an adjustment mode is maintained, in a specific address in a memory, and then transitions to the adjustment mode. The host board B can know that the optical transceiver B is in the adjustment mode by accessing the specific address and checking the stored value. The controller 40 executes a process program to be executed in the adjustment mode to thereby control the optical transceiver B. The adjustment mode means that any one of the communication states B, C, and D is maintained.

Figure 7:
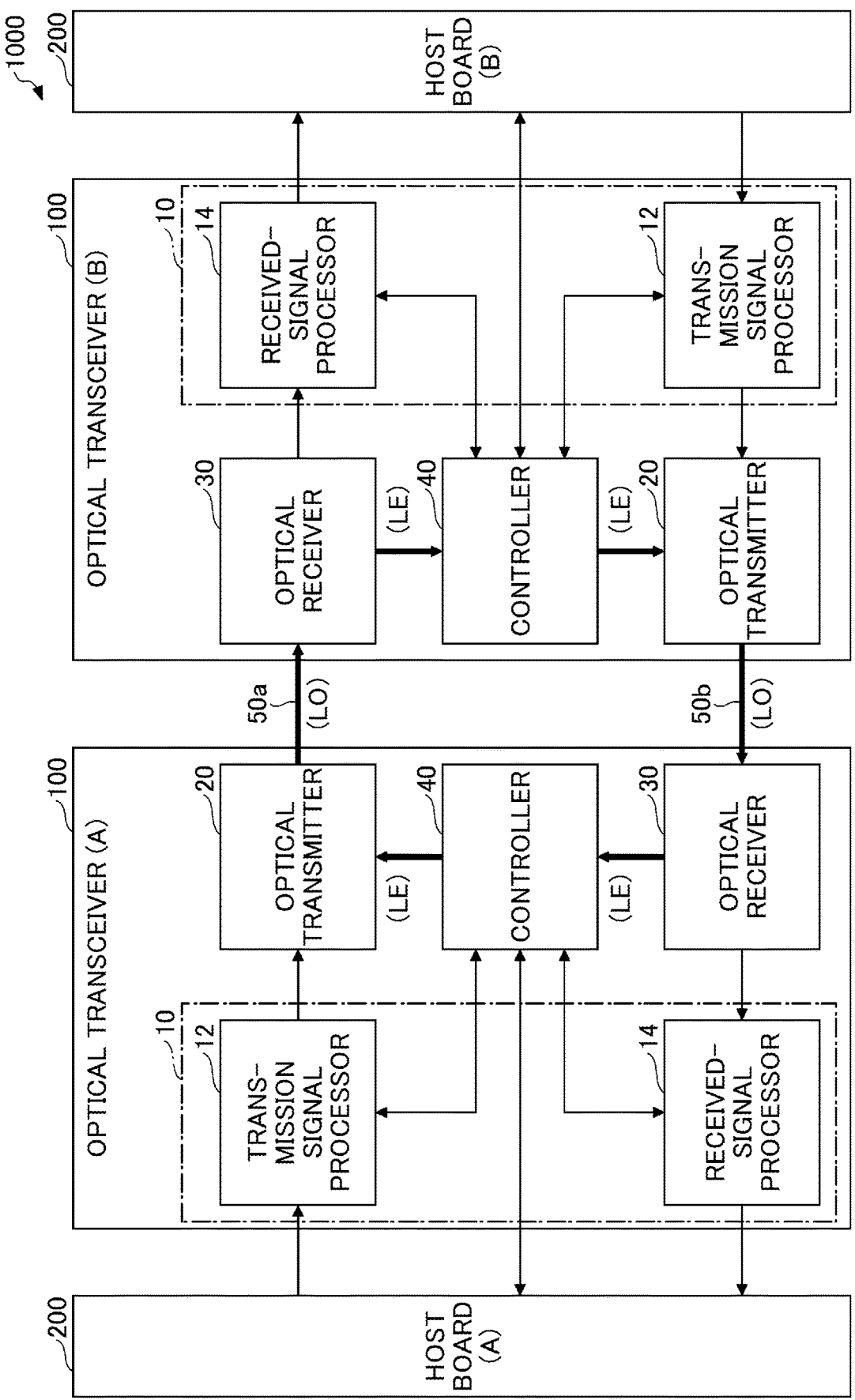
FIG. 7 is a diagram for describing various signals transmitted in a communication state B illustrated in FIG. 2, FIG. 3, and FIG. 4.

FIG. 7 is a diagram for describing the transmission of various signals in the communication state B in FIG. 2, FIG. 3, and FIG. 4. Signal lines expressed by bold arrows indicate paths along which signals are transmitted between the optical transceivers A and B that transmit and receive high-speed PAM signals. Operations of the optical transceivers A and B are the same, and accordingly, the operation of the optical transceiver A will be described below.

The controller 40 of the optical transceiver A outputs the low-speed electrical signal (NRZ signal), indicating information to be transmitted to the optical transceiver B, to the optical transmitter 20. The optical transmitter 20 converts the low-speed electrical signal from the controller 40 into an analog signal, and then modulates the laser current (drive current) in response to the analog signal converted from the low-speed electrical signal. The optical transmitter 20 generates the low-speed optical signal in accordance with a modulated laser current, and transmits the generated low-speed optical signal to the optical transceiver B. For example, a low-speed NRZ optical signal can be generated by increasing or decreasing the laser current in comparison to a threshold current for a laser diode. The low-speed electrical signal may be converted into an analog signal, at a location that is outside (e.g., inside of the controller 40) of the optical transmitter 20. For example, the controller 40 includes a digital-to-analog (D/A) converter (DAC), and may generate an analog signal of the low-speed electrical signal, through the DAC.

The optical receiver 30 of the optical transceiver A converts the low-speed NRZ optical signal, which is received from the optical transceiver B, into a low-speed electrical signal LE, and then outputs the low-speed electrical signal LE converted from the low-speed NRZ optical signal, to the controller 40.

Figure 8:
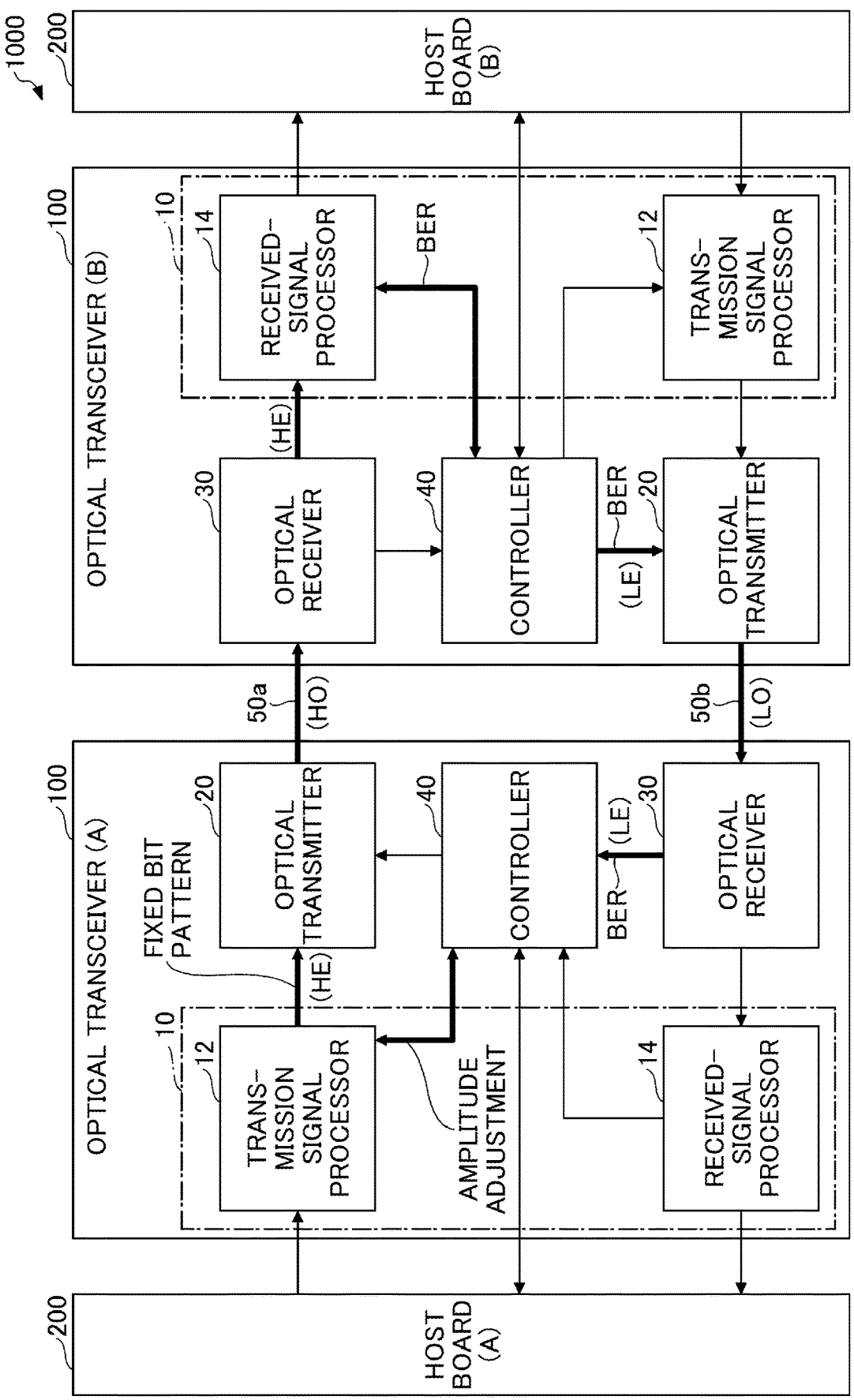
FIG. 8 is a diagram for describing various signals transmitted in a communication state C illustrated in FIG. 3.

FIG. 8 is a diagram for describing the transmission of various signals used in the communication state C in FIG. 3. Signal lines indicated by bold arrows show examples of paths along which signals are transmitted in the communication state C.

In the optical transceiver A, the controller 40 causes the transmission signal processor 12 to generate the PAM4 signal including a fixed bit pattern such as PRBSQ. For example, in this case, levels 0 to 3 of the PAM4 signal are respectively set to values obtained prior to transmission of the PAM4 signal. The transmission signal processor 12 outputs the generated PAM4 signal including the fixed bit pattern to the optical transmitter 20 as the high-speed electrical signal HE. The optical transmitter 20 converts the high-speed electrical signal HE including the fixed bit pattern, which is received from the transmission signal processor 12, into a high-speed optical signal HO (high-speed PAM optical signal), and then transmits the high-speed optical signal HO converted from the high-speed electrical signal HE, to the optical transceiver B.

In the optical transceiver B, the optical receiver 30 receives the high-speed PAM optical signal HO including the fixed bit pattern, from the optical transceiver A, as the high-speed optical signal HO. The optical receiver 30 converts the received high-speed PAM optical signal HO including the fixed bit pattern, into a high-speed electrical signal HE, and then outputs the high-speed electrical signal HE to the received-signal processor 14.

In the optical transceiver B, the received-signal processor 14 calculates a BER for the high-speed electrical signal HE, based on the fixed bit pattern and then outputs BER information indicating the calculated BER to the controller 40 as a low-speed electrical signal. In this case, the BER information may be transmitted from the received-signal processor 14 to the controller 40 via a serial communication bus, such as a serial peripheral interface (SPI) or an inter-integrated circuit ($I^2C$).

The controller 40 outputs the low-speed electrical signal LE to the optical transmitter 20, based on the BER information from the received-signal processor 14. By modulating the laser current of the optical transmitter 20 with the low-speed electrical signal LE, the low-speed optical signal LO including the BER information is transmitted to the optical transceiver A.

In the optical transceiver A, the optical receiver 30 receives the low-speed optical signal LO including the BER information, from the optical transceiver B. The optical receiver 30 converts the received low-speed optical signal LO into a low-speed electrical signal LE and then outputs the low-speed electrical signal LE to the controller 40. Based on the BER information included in the low-speed electrical signal LE, the controller 40 determines whether a bit error resulting in a communication error can be corrected by KP4-FEC or the like.

In the optical transceiver A, if the BER is less than or equal to a predetermined value (threshold), the controller 40 completes the adjustment of the amplitude in the communication state C. In contrast, if the bit error is greater than the threshold, the controller 40 adjusts, for example, one or more of level 1 and level 2 of the PAM4 signal that is transmitted from the transmission signal processor 12. The threshold is set as a BER value that can be corrected, for example, by KP4-FEC or the like. The communication between the controller 40 and the transmission signal processor 12 may be performed through a serial communication bus, such as a SPI or $I^2C$.

The transmission signal processor 12 outputs, to the optical transmitter 20, the PAM4 signal, as a high-speed electrical signal HE, that includes the fixed bit pattern such as a PRBSQ pattern and of which levels are adjusted. The optical transmitter 20 converts the high-speed electrical signal HE into a high-speed optical signal HO and then transmits the high-speed optical signal HO including the fixed bit pattern, to the optical transceiver B.

Until the BER is less than or equal to the threshold, (i) a process in which the optical transceiver A adjusts each level of the PAM4 signal and then transmits a fixed bit pattern, and (ii) a process in which the optical transceiver B measures a BER and then transmits BER information, are repeatedly performed.

Figure 9:
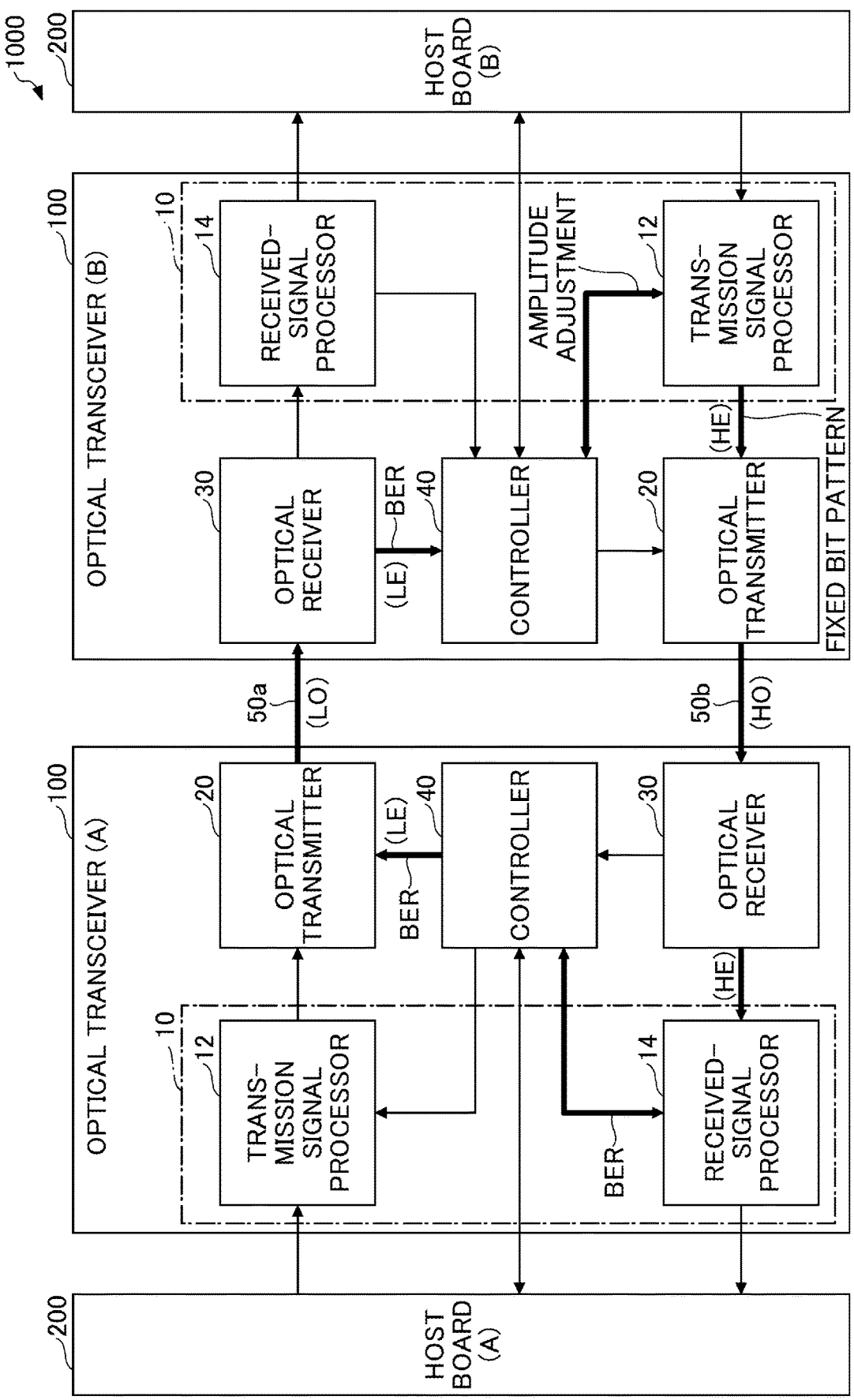
FIG. 9 is a diagram for describing various signals transmitted in a communication state D illustrated in FIG. 4.

FIG. 9 is a diagram for describing the transmission of various signals used in the communication state D in FIG. 4. The operation illustrated in FIG. 9 is performed as in a case where the optical transceiver A and the optical transceiver B, as illustrated in FIG. 8, are replaced with each other. In FIG. 9, until the BER is less than or equal to a predetermined value (threshold), (i) a process in which the optical transceiver B repeatedly adjusts each level of the PAM4 signal and then transmits a fixed bit pattern, and (ii) a process in which the optical transceiver A measures the BER and then transmits BER information, are repeatedly performed.

As described above, in the first embodiment, while communication between the optical transceivers A and B is performed through the high-speed PAM optical signals, when a communication error occurs, a communication error state automatically returns to a state in which the communication can be performed at high speed at which the BER is less than or equal to a predetermined value (threshold), without using the control by the host boards A and B. That is, even when the communication error occurs between the optical transceivers A and B that transmit and receive high-speed PAM optical signals between each other, the optical transceivers A and B transition to the adjustment mode and thus transmission and reception characteristics of each of the optical transceivers A and B can be adjusted. Further, by adjusting each level of the PAM4 signal such that a BER value is less than or equal to the threshold, the optical transceivers A and B transition back to a high-speed communication mode and thus communicate with each other through the high-speed PAM optical signals.

In the adjustment mode, without using the host boards A and B, the optical transceivers A and B can transmit and receive various information that is generated by the controllers 40, by using low-speed optical signals, and the various information is used to return from the communication error state. A modulation rate for the low-speed optical signal is less than a modulation rate for the high-speed optical signal. With this arrangement, for example, even when a communication error occurs through the high-speed optical signal, the optical transceivers A and B can successfully transmit and receive BER information. Therefore, the communication system 1000 can return from the communication error state.

Second Embodiment

Figure 10:
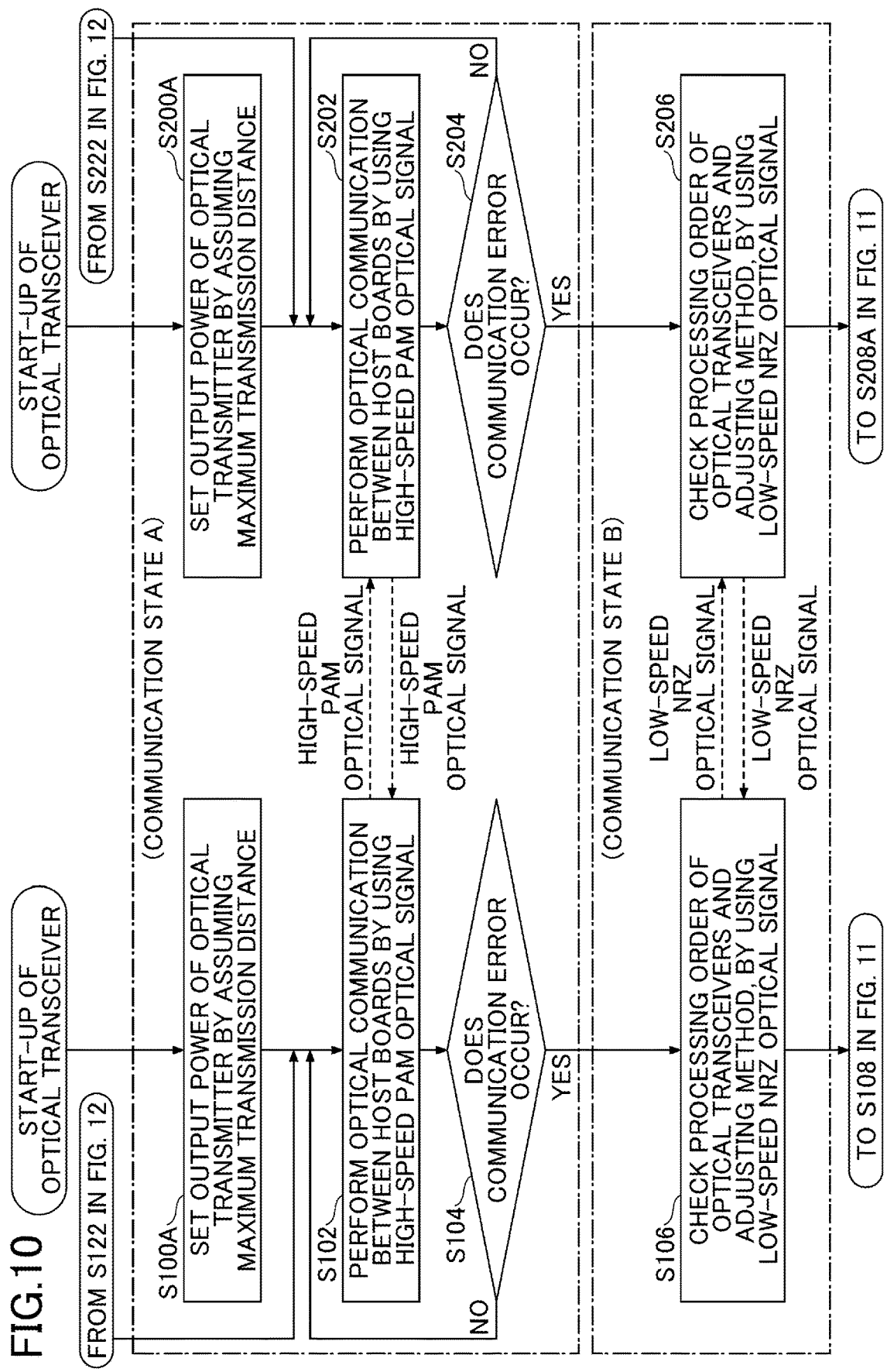
FIG. 10 is an operational flow diagram illustrating an example of the optical transceivers that communicate with each other according to a second embodiment.
Figure 11:
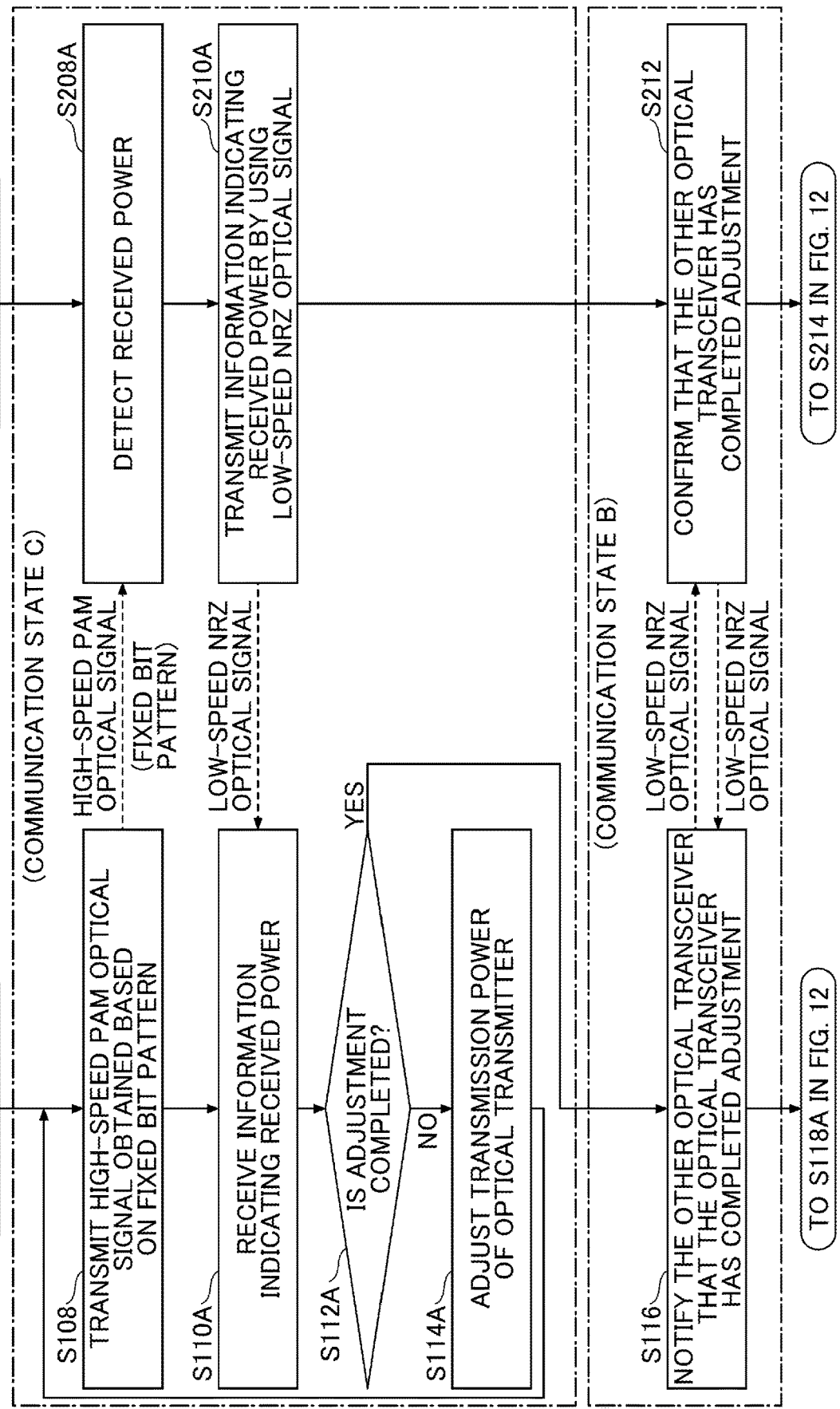
FIG. 11 is a flow diagram illustrating a continuation of the operation of FIG. 10.
Figure 12:
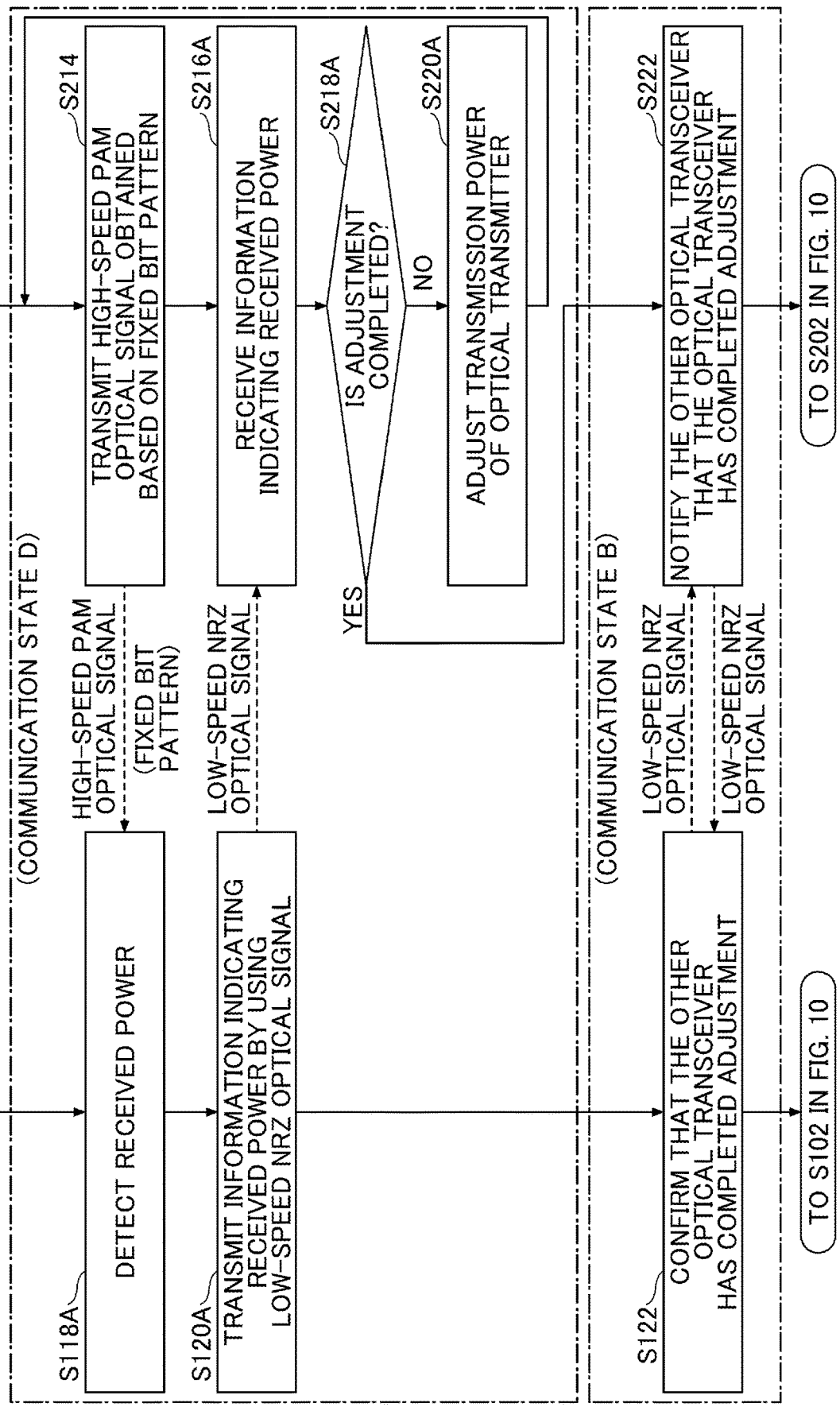
FIG. 12 is a flow diagram illustrating a continuation of the operation of FIG. 11.

[Sequence of Operation of Optical Transceivers A and B]
FIGS. 10 to 12 are flow diagrams illustrating an example of the operation of the optical transceivers A and B that communicate with each other according to a second embodiment. The same step numbers denote the same steps that are described in FIGS. 2 to 4, and accordingly, the detailed description thereof is omitted. The optical transceivers A and B that perform the steps illustrated in FIGS. 10 to 12, as well as the communication system including the optical transceivers A and B, are configured as in the optical transceivers A and B illustrated in FIG. 1 and the communication system 1000 as illustrated in FIG. 1.

For each of the optical transceivers A and B for long-distance transmission, an optical receiving element, such as an avalanche photodiode having an amplification effect or a semiconductor optical amplifier, is provided in the optical receiver 30. With this arrangement, decreases in received power due to the long-distance transmission can be compensated. In contrast, when each optical transceiver 100 for long-distance transmission is used for short-distance transmission, decreases in an amount of received power are reduced. With this arrangement, when a received signal is amplified by the optical receiver 30, a signal-to-noise ratio is likely to be increased, and thus communication errors may occur in a reception process performed by the received-signal processor 14.

In the present embodiment, even when a transmission distance is relatively short and received power of a given optical transceiver (for example, the optical transceiver B) of a receiving side is increased, transmission power of a given optical transceiver (for example, the optical transceiver A) of a transmission side can be appropriately adjusted. With this arrangement, generation of the communication error can be suppressed. Thus, even when the transmission distance is not known in advance, received power of one optical transceiver can be adjusted by adjusting transmission power of the other optical transceiver in accordance with the transmission distance used for the communication system 1000.

In the communication state A in FIG. 10, steps S100A and S200A are performed instead of steps S100 and S200 illustrated in FIG. 2. In steps S100A and S200A, the optical transceivers A and B respectively set power (transmission power) output from the optical transmitters 20, by assuming a maximum transmission distance for the communication system 1000. The transmission power of each optical transmitter 20 is set by a corresponding controller 40. For example, information on the transmission power used for the maximum transmission distance is prestored in a memory in each controller. Each controller 40 retrieves information indicating the transmission power, from a corresponding memory, and may set the information. Other operations in the communication state A are performed as in the communication state A illustrated in FIG. 2.

The operation in the communication state B illustrated in FIG. 10 is performed as in the communication state B illustrated in FIG. 2, except that information necessary for the adjustment of the power of the optical transmitter 20 is used instead of information necessary for the adjustment of each level of the PAM4 signal. The modulation rate for the low-speed NRZ signal is sufficiently less than that for the high-speed PAM optical signal. Also, when a given amplitude (difference between level 1 and level 0) of the low-speed NRZ signal is the same as a given amplitude (difference between level 3 and level 0) of the high-speed PAM optical signal, an eye opening for the low-speed NRZ signal is about three times an eye opening for the high-speed PAM optical signal. Under these conditions, a signal-to-noise ratio is improved. As a result, the optical transceivers A and B transition to the communication state B, and thus (i) a status of occurrence of an error and (ii) information on an adjustment method of transmission power obtained using the PAM4 can be transmitted to and from the optical transceivers A and B. After step S106, the optical transceiver A proceeds to step S108 in FIG. 11. After step S206, the optical transceiver B proceeds to step S208A in FIG. 11.

In the communication state C in FIG. 11, step S208A, step S210A, step S110A, step S112A, and step S114A are respectively performed instead of step S208, step S210, step S110, step S112, and step S114, as illustrated in FIG. 3. Other operations in the communication state C are performed as in the communication state C illustrated in FIG. 3.

In step S208A, the controller 40 of the optical transceiver B detects received power of the high-speed PAM optical signal including a fixed bit pattern, and the high-speed PAM optical signal from the optical transceiver A is received by the optical receiver 30. In the present embodiment, the controller 40 of the optical transceiver B illustrated in FIG. 8 detects received power of the optical receiver 30, instead of receiving BER information from the received-signal processor 14. For example, in accordance with a received high-speed PAM optical signal, the controller 40 can calculate the received power based on a photocurrent output from the optical receiver 30. Alternatively, the optical receiver 30 detects the received power of the high-speed PAM optical signal and then may transmit information indicating detected received power, to the controller 40.

In step S210A, the controller 40 of the optical transceiver B transmits the information indicating the detected received power to the optical transceiver A, by using a low-speed NRZ optical signal. Steps S208A and S210A are repeatedly performed when the optical transceiver A transmits the high-speed PAM optical signal that is obtained by changing transmission power of the high-speed PAM optical signal. When the optical transceiver B does not receive the high-speed PAM optical signal from the optical transceiver A, the optical transceiver B shifts the operating state from the communication state C to the communication state B.

In step S110A, the optical transceiver A receives the information, indicating the received power, that is included in the low-speed NRZ optical signal received from the optical transceiver B. In this case, the optical transceiver A may continue to transmit the high-speed PAM optical signal in step S108 until the optical transceiver A receives the information indicating the received power that is included in the low-speed NRZ optical signal from the optical transceiver B. With this arrangement, information indicating received power can be reliably received in response to transmitting the high-speed PAM optical signal that is obtained by changing each level.

Then, in step S112A, the optical transceiver A determines whether the transmission power of the optical transmitter 20 is completely adjusted. If the adjustment is completed, the optical transceiver A shifts the operating state from the communication state C to the communication state B (step S116). If the adjustment is not completed, the optical transceiver A performs step S114A. For example, if received power at the optical transceiver B is within a predetermined range, the optical transceiver A determines the completion of the adjustment. If the received power at the optical transceiver B is out of the predetermined range, the optical transceiver A continues to adjust the transmission power.

In step S114A, the controller 40 of the optical transceiver A adjusts transmission power of the optical transmitter 20 and then returns the process to step S108. For example, by reducing the laser current (drive current) of the laser diode that generates the high-speed optical signal HO used for the optical transmitter 20, transmission power of the high-speed optical signal HO that is transmitted from the optical transmitter 20 is reduced. Then, (i) transmitting, by the optical transceiver A, of the high-speed optical signal HO including the fixed bit pattern, to the optical transceiver B, and (ii) detecting of received power by the optical transceiver B, and (iii) determining, by the optical transceiver A, of completion of adjustment of transmission power, are repeatedly performed again.

The operation in the communication state B illustrated in FIG. 11 is performed as in the communication state B illustrated in FIG. 3, except that a notification of completion of power adjustment is transmitted to and from a given optical transmitter 20, instead of using a notification of completion of adjustment of a given output amplitude. After step S116, the optical transceiver A proceeds to step S118A in FIG. 12. After step S212, the optical transceiver B proceeds to step S214 in FIG. 12.

In the communication state D in FIG. 12, steps S118A, S120A, S216A, S218A, and S220A are respectively performed instead of the steps S118, S120, S216, S218, and S220, as illustrated in FIG. 3. Other operations in the communication state D are performed as in the communication state D illustrated in FIG. 4.

In the communication state D in FIG. 12, transmission power for the optical transmitter 20 of the optical transceiver B is adjusted based on received power obtained when the optical receiver 30 of the optical transceiver A receives a given high-speed PAM optical signal. With this arrangement, in the communication state D, the process flow of the optical transceiver A is similar to the process flow by the optical transceiver B in the communication state C as illustrated in FIG. 11, and the process flow by the optical transceiver B is similar to the process flow by the optical transceiver A in the communication state C as illustrated in FIG. 11.

The operation in the communication state B in FIG. 12 is performed as in the communication state B in FIG. 4, except that a notification of completion of adjustment of transmission power for the optical transmitter 20 is transmitted to and from a given optical transceiver instead of using the notification of completion of level adjustment of the high-speed PAM4 optical signal. After step S122, the optical transceiver A returns the process to step S102 in FIG. 10. After step S222, the optical transceiver B returns the process to step S202 in FIG. 10.

As described above, in the second embodiment, as in the first embodiment described above, transmission and reception characteristics of the optical transceivers A and B can be adjusted even when a communication error occurs between the optical transceivers A and B that transmit and receive optical signals between each other. For example, when a transmission distance is relatively short and received power is greater, transmission power of a transmission side can be adjusted to appropriately adjust the received power. Thus, occurrence of communication errors can be suppressed. In other words, received power can be adjusted in accordance with a transmission distance used for the communication system 1000, even when the transmission distance is not known beforehand.

Although the embodiments have been described in detail above, the present disclosure is not limited to the embodiments. Various modifications, changes, substitutions, additions, deletions, and any combination of embodiments can be made within the scope set forth in the present disclosure.

What is claimed is:

1. A communication system comprising:
  a first optical transceiver including
    a transmission signal processor configured to generate a multi-valued pulse amplitude modulation signal including a fixed bit pattern,
    a first optical transmitter configured to convert the multi-valued pulse amplitude modulation signal into an optical transmission signal to transmit the optical transmission signal,
    a first optical receiver configured to receive an optical adjustment signal that is transmitted from a second optical transceiver to reproduce an adjustment signal from the optical adjustment signal, and
    a first controller configured to control the transmission signal processor, the first optical transmitter, and the first optical receiver; and the second optical transceiver configured to communicate with the first optical transceiver, the second optical transceiver including
   a second optical receiver configured to receive the optical transmission signal to convert the received optical transmission signal into a received signal,
   a received-signal processor configured to measure a bit error rate of the received signal, based on the fixed bit pattern,
   a second optical transmitter configured to convert the adjustment signal that includes measurement information indicating the bit error rate, into the optical adjustment signal to transmit the optical adjustment signal, and
   a second controller configured to control the second optical receiver, the received-signal processor, and the second optical transmitter,
wherein the first controller is configured to
   extract the measurement information indicating the bit error rate, from the reproduced adjustment signal, and
   control the transmission-signal processor based on the extracted measurement information indicating the bit error rate, to adjust light power at each multi-valued pulse amplitude modulation level of the optical transmission signal.

2. An optical transceiver for communicating with a second optical transceiver via an optical fiber, the optical transceiver comprising:
   an optical receiver configured to
      receive, from the second optical transceiver, (i) a first optical transmission signal and (ii) a first optical adjustment signal that includes measurement information indicating a bit error rate that is measured by the second optical transceiver,
      convert the received first optical transmission signal into a first received signal, and
      reproduce a first adjustment signal from the received first optical adjustment signal;
   a received-signal processor configured to measure a bit error rate of the first received signal, based on a fixed bit pattern;
   a transmission signal processor configured to generate a multi-valued pulse amplitude modulation signal including the fixed bit pattern;
   an optical transmitter configured to
      convert the multi-valued pulse amplitude modulation signal into a second optical transmission signal,
      transmit the second optical transmission signal to the second optical transceiver,
      convert, into a second optical adjustment signal, a second adjustment signal that includes measurement information indicating the bit error rate that is measured by the received-signal processor, and
      transmit the second optical adjustment signal to the second optical transceiver; and
   a controller configured to
      control the optical receiver, the received-signal processor, the transmission signal processor, and the optical transmitter,
      extract, from the first adjustment signal reproduced by the optical receiver, the measurement information indicating the bit error rate that is measured by the second optical transceiver, and
      control the transmission signal processor based on the extracted measurement information indicating the bit error rate, to adjust light power at each multi-valued pulse amplitude modulation level of the second optical transmission signal.

3. A control method by a communication system including a first optical transceiver and a second optical transceiver that communicates with the first optical transceiver, the control method comprising:
   generating, by the first optical transceiver, a multi-valued pulse amplitude modulation signal including a fixed bit pattern;
   converting, by the first optical transceiver, the multi-valued pulse amplitude modulation signal into an optical transmission signal to transmit the optical transmission signal;
   receiving, by the first optical transceiver, an optical adjustment signal that is transmitted from the second optical transceiver to reproduce an adjustment signal from the optical adjustment signal;
   receiving, by the second transceiver, the optical transmission signal to convert the received optical transmission signal into a received signal;
   measuring, by the second transceiver, a bit error rate of the received signal, based on the fixed bit pattern;
   converting, by the second transceiver, the adjustment signal that includes measurement information indicating the bit error rate, into the optical adjustment signal to transmit the optical adjustment signal;
   extracting, by the first transceiver, the measurement information indicating the bit error rate, from the reproduced adjustment signal; and
   adjusting, by the first transceiver, optical power at each multi-valued pulse amplitude modulation level of the optical transmission signal to be transmitted to the second optical transceiver, based on the extracted measurement information indicating the bit error rate.

4. A control method by an optical transceiver that communicates with a second optical transceiver, the control method comprising:
   receiving (i) a first optical transmission signal and (ii) a first optical adjustment signal that includes measurement information indicating a bit error rate that is measured by the second optical transceiver;
   converting the received first optical transmission signal into a first received signal, and
   reproducing a first adjustment signal from the received first optical adjustment signal;
   measuring a bit error rate of the first received signal, based on a fixed bit pattern;
   generating a multi-valued pulse amplitude modulation signal including the fixed bit pattern;
   converting the multi-valued pulse amplitude modulation signal into a second optical transmission signal;
   transmitting the second optical transmission signal to the second optical transceiver;
   converting, into a second optical adjustment signal, a second adjustment signal that includes measurement information indicating a measured bit error rate;
   extracting the measurement information indicating the bit error rate measured by the second optical transceiver, from the reproduced first adjustment signal; and
   adjusting optical power at each multi-valued pulse amplitude modulation level of the second optical transmission signal, based on the extracted measurement information indicating the bit error rate.

* * * * *